(12) United States Patent
Weiner et al.

(10) Patent No.: US 9,098,850 B2
(45) Date of Patent: Aug. 4, 2015

(54) SYSTEM AND METHOD FOR TRANSACTION SECURITY RESPONSIVE TO A SIGNED AUTHENTICATION

(71) Applicant: Ping Identity Corporation, Denver, CO (US)

(72) Inventors: Avish Jacob Weiner, Tel Aviv (IL); Ran Ne'Man, Ramat Gan (IL)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 13/625,148

(22) Filed: Sep. 24, 2012

(65) Prior Publication Data

US 2013/0023240 A1 Jan. 24, 2013

Related U.S. Application Data

(63) Continuation-in-part of application No. PCT/IL2012/050199, filed on Jun. 7, 2012, and a continuation-in-part of application No. PCT/IL2012/050178, filed on May 16, 2012, and a (Continued)

(51) Int. Cl.
*G06Q 20/00* (2012.01)
*G06Q 20/40* (2012.01)
(Continued)

(52) U.S. Cl.
CPC .......... *G06Q 20/401* (2013.01); *H04L 63/0861* (2013.01); *H04L 63/107* (2013.01); *H04W 12/06* (2013.01); *H04W 12/12* (2013.01)

(58) Field of Classification Search
USPC ...................................... 705/50, 75
See application file for complete search history.

(56) References Cited

U.S. PATENT DOCUMENTS 5,420,606 A 5/1995 Begum et al.
5,875,394 A 2/1999 Daly et al.
(Continued)

FOREIGN PATENT DOCUMENTS

EP 1424861 A1 6/2004
EP 1460573 A2 9/2004
(Continued)

OTHER PUBLICATIONS

Miller, "Payment Method Bypasses the Wallet", The New York Times Reprint, May 23, 2011.
(Continued)

*Primary Examiner* — Zeshan Qayyum

(57) ABSTRACT

A system arranged to authenticate a user via its mobile device to a service provider, the system comprising: an authentication server; the user mobile device, the user mobile device provided with a verification application arranged to communicate with the authentication server; and a notification server in communication with the authentication server and arranged to transmit a notification to the user mobile device responsive to the authentication server, the authentication server arranged to provide a signed authentication to the service provider responsive to present and historical information regarding one of: the user mobile device; and an additional user device in communication with said authentication server, said signed authentication provided in accordance with a rule set determined by an authorized entity stored on said authentication server memory governing the required present and historical information attribute.

26 Claims, 12 Drawing Sheets

Related U.S. Application Data continuation-in-part of application No. 13/442,861, filed on Apr. 10, 2012, now Pat. No. 8,346,672.

(60) Provisional application No. 61/669,084, filed on Jul. 8, 2012, provisional application No. 61/494,946, filed on Jun. 9, 2011, provisional application No. 61/504,754, filed on Jul. 6, 2011, provisional application No. 61/529,258, filed on Aug. 31, 2011, provisional application No. 61/566,660, filed on Dec. 4, 2011, provisional application No. 61/486,866, filed on May 17, 2011.

(51) Int. Cl.
*H04W 12/06* (2009.01)
*H04L 29/06* (2006.01)
*H04W 12/12* (2009.01)

(56) References Cited

U.S. PATENT DOCUMENTS

| | | | |
|---|---|---|---|
| 5,892,900 A | 4/1999 | Ginter et al. | |
| 5,991,407 A * | 11/1999 | Murto | 380/248 |
| 6,082,620 A | 7/2000 | Bone, Jr. | |
| 6,338,140 B1 * | 1/2002 | Owens et al. | 713/168 |
| 6,510,502 B1 * | 1/2003 | Shimizu | 711/164 |
| 6,584,309 B1 | 6/2003 | Whigham | |
| 6,687,346 B1 | 2/2004 | Swartz et al. | |
| 6,705,517 B1 * | 3/2004 | Zajkowski et al. | 235/379 |
| 7,028,906 B2 | 4/2006 | Challa et al. | |
| 7,347,361 B2 | 3/2008 | Lovett | |
| 7,356,510 B2 * | 4/2008 | Durand et al. | 705/51 |
| 7,509,119 B2 | 3/2009 | Eonnet | |
| 7,706,784 B2 | 4/2010 | Weiner et al. | |
| 8,185,956 B1 | 5/2012 | Bogorad et al. | |
| 8,510,820 B2 | 8/2013 | Oberheide et al. | |
| 8,578,454 B2 | 11/2013 | Grim | |
| 8,763,077 B2 | 6/2014 | Oberheide et al. | |
| 2001/0014870 A1 | 8/2001 | Saito et al. | |
| 2002/0023027 A1 | 2/2002 | Simonds | |
| 2002/0028671 A1 * | 3/2002 | I' Anson et al. | 455/414 |
| 2002/0042722 A1 | 4/2002 | Tsuji et al. | |
| 2002/0091569 A1 | 7/2002 | Kitaura et al. | |
| 2002/0198777 A1 | 12/2002 | Yuasa | |
| 2003/0047613 A1 | 3/2003 | Funamoto et al. | |
| 2003/0149663 A1 | 8/2003 | Vonholm et al. | |
| 2003/0163384 A1 | 8/2003 | Hendra | |
| 2003/0163567 A1 | 8/2003 | McMorris et al. | |
| 2003/0193441 A1 | 10/2003 | Zimmerman et al. | |
| 2004/0121781 A1 | 6/2004 | Sammarco | |
| 2004/0243519 A1 | 12/2004 | Perttila et al. | |
| 2005/0071673 A1 | 3/2005 | Saito | |
| 2005/0091539 A1 * | 4/2005 | Wang et al. | 713/201 |
| 2005/0120213 A1 | 6/2005 | Winget et al. | |
| 2005/0242921 A1 | 11/2005 | Zimmerman et al. | |
| 2005/0255889 A1 | 11/2005 | Haseba et al. | |
| 2006/0044115 A1 | 3/2006 | Doi et al. | |
| 2006/0165060 A1 | 7/2006 | Dua | |
| 2006/0174322 A1 | 8/2006 | Turner et al. | |
| 2006/0174332 A1 * | 8/2006 | Bauban et al. | 726/5 |
| 2006/0230145 A1 * | 10/2006 | Zarakhovsky et al. | 709/225 |
| 2006/0235796 A1 * | 10/2006 | Johnson et al. | 705/44 |
| 2006/0271643 A1 | 11/2006 | Stallman | |
| 2007/0055749 A1 | 3/2007 | Chien | |
| 2007/0088950 A1 | 4/2007 | Wheeler et al. | |
| 2007/0107044 A1 | 5/2007 | Yuen et al. | |
| 2007/0156436 A1 | 7/2007 | Fisher et al. | |
| 2007/0192245 A1 * | 8/2007 | Fisher et al. | 705/39 |
| 2007/0194123 A1 | 8/2007 | Frantz et al. | |
| 2007/0202894 A1 | 8/2007 | Dhebri et al. | |
| 2007/0214155 A1 | 9/2007 | Chang et al. | |
| 2007/0255653 A1 | 11/2007 | Tumminaro et al. | |
| 2008/0084272 A1 | 4/2008 | Modiano | |
| 2008/0147546 A1 | 6/2008 | Weichselbaumer et al. | |
| 2008/0208759 A1 | 8/2008 | Royyuru | |
| 2008/0210754 A1 | 9/2008 | Lovett | |
| 2008/0222031 A1 | 9/2008 | Shattner et al. | |
| 2008/0227471 A1 * | 9/2008 | Dankar et al. | 455/456.6 |
| 2008/0307515 A1 | 12/2008 | Drokov et al. | |
| 2009/0044025 A1 | 2/2009 | She | |
| 2009/0062939 A1 * | 3/2009 | Park | 700/83 |
| 2009/0119190 A1 | 5/2009 | Realini | |
| 2009/0138366 A1 | 5/2009 | Bemmel et al. | |
| 2009/0287565 A1 | 11/2009 | Bishop et al. | |
| 2009/0288012 A1 | 11/2009 | Hertel et al. | |
| 2010/0031349 A1 | 2/2010 | Bingham | |
| 2010/0268618 A1 | 10/2010 | McQuilken | |
| 2010/0318801 A1 | 12/2010 | Roberge et al. | |
| 2011/0022484 A1 * | 1/2011 | Smith et al. | 705/17 |
| 2011/0070901 A1 | 3/2011 | Alward | |
| 2011/0078081 A1 | 3/2011 | Pirzadeh et al. | |
| 2011/0219230 A1 | 9/2011 | Oberheide et al. | |
| 2012/0198228 A1 | 8/2012 | Oberheide et al. | |
| 2013/0212387 A1 | 8/2013 | Oberheide et al. | |

FOREIGN PATENT DOCUMENTS

| | | |
|---|---|---|
| FR | 2 832 829 | 5/2003 |
| GB | 2460304 A | 12/2009 |
| WO | 9834421 A2 | 8/1998 |
| WO | 0173580 A1 | 10/2001 |
| WO | 0208981 A1 | 1/2002 |
| WO | 0219199 A1 | 3/2002 |
| WO | 0242926 A1 | 5/2002 |
| WO | 02060209 A1 | 8/2002 |
| WO | WO 02/060209 | 8/2002 |
| WO | 02102099 A2 | 12/2002 |
| WO | 03027937 A2 | 4/2003 |
| WO | 03046847 A1 | 6/2003 |
| WO | WO 2006/090392 | 8/2006 |
| WO | 2006102848 A1 | 10/2006 |
| WO | 2007021658 A2 | 2/2007 |
| WO | 2007048976 A2 | 5/2007 |
| WO | 2007106906 A2 | 9/2007 |
| WO | 2007117073 A1 | 10/2007 |
| WO | 2008027620 A1 | 3/2008 |
| WO | 2009032687 A2 | 3/2009 |
| WO | 2009113057 A1 | 9/2009 |
| WO | WO 2009/156880 | 12/2009 |
| WO | 2010087535 A1 | 8/2010 |
| WO | WO 2010/111023 | 9/2010 |
| WO | WO 2010/120222 | 10/2010 |
| WO | WO 2010/140876 | 12/2010 |
| WO | 2011083471 A1 | 7/2011 |

OTHER PUBLICATIONS

Latze et al., "A Proof of Concept Implementation of a Secure E-Commerce Authentication Scheme", Jul. 2009, Information Security South Africa, Johannesburg, South Africa, retrieved from Internet on Jun. 25, 2012 from http://www.latze.ch/latze-ruppen-ultes-nitsche.pdf.

McHeck Brochure, Retrieved from Internet on Jun. 25, 2012 from http://main.mchek.com/pdf/mchek-brochure.pdf.

Gao, "P2P-Paid: A Peer-to-Peer Wireless Payment System", Proceedings of the 2005 Second IEEE International Workshop on Mobile Commerce and Services (WMCS'05), 2005, 0-7695-2391-9/05, Institute of Electrical and Electronics Engineers.

International Search Report for PCT application PCT/IL2011/00015, Issued by the USPTO, mailing date May 23, 2011.

Carr, "Mobile Payment Systems and Services: An Introduction", 2007, Retrieved from Internet on Jun. 25, 2012 from http://www.mpf.org.in/pdf/Mobile%20Payment%20Systems%20and%20Services.pdf.

"Mobile Payment", Wikipedia, the free encyclopedia, Accessed on Jan. 20, 2010.

Fun et al., "Privacy in New Mobile Payment Protocol", World Academy of Science, Engineering and Technology, 2008, issue 47, pp. 443-447.

Screen Shot of web site of Mobiqa Airlines, Retrieved from the Internet on Dec. 9, 2009 from http://www.mobiqa.com/airlines/?gclid=CLqyxOefyZ4CFWIr4wodbx7wrg.

(56) References Cited

OTHER PUBLICATIONS

"IPCS & barcode enabling mobile payment", Retrieved from the Internet on Jun. 25, 2012 from http://www.ipcslive.com/pdf/IPCSbar.pdf.
International Search Report for PCT application PCT/IL2009/00263, Issued by the EPO, mailing date Jul. 6, 2009.
Weiss, "Performing Relay Attacks on ISO 14443 Contactless Smart Cards using NFC Mobile Equipment", Master's Thesis in Computer Science, University of Munich, Germany, May 17, 2010.
Mulliner, "Vulnerability Analysis and Attacks on NFC-enabled Mobile Phones", 2009 International Conference on Availability, Reliability and Security, pp. 695-700, 978-0-7695-3564-7/09, Institute of Electrical and Electronic Engineers.
Mulliner, "Attacking NFC Mobile Phones", 25th Chaos Communication Congress, Dec. 2008, Berlin, Germany.
"Is NFC too Slow?", Insight-Driven Retailing Blog, Oracle, Retrieved from the Internet on May 15, 2011.
Heine, "GSM Networks: Protocols, Terminology, and Implementation", 1999, pp. 116 and 328, Artech House, Inc., Norwood, MA.
Newton's Telecom Dictionary, Jul. 2010, 'Mixed Mode'—'MNA', CMP Books, Gilroy, CA.
Written Opinion of the International Searching Agency for PCT application PCT/IL2011/00015, Issued by the USPTO, mailing date May 23, 2011.
Written Opinion of the International Searching Agency for PCT application PCT/IL2009/00263, Issued by the EPO, mailing date Jul. 6, 2009.
Vamosi et al., "Multi-Channel Authentication Via Mobile Banking", Javelin Strategy & Research, Sep. 2009, Pleasanton, CA.
International Search Report for PCT application PCT/IL2012/050178, Issued by the EPO, mailing date Sep. 17, 2012.
Written Opinion of the International Searching Agency for International Search Report for PCT application PCT/IL2012/050178, Issued by the EPO, mailing date Sep. 17, 2012.
International Search Report for PCT application PCT/IL2012/050199, Issued by the EPO, mailing date Sep. 26, 2012.
Written Opinion of the International Searching Agency for International Search Report for PCT application PCT/IL2012/050199, Issued by the EPO, mailing date Sep. 26, 2012.
International Search Report and Written Opinion for PCT application PCT/IL2013/050318, Issued by the EPO, mailing date Jul. 31, 2013.
International Search Report and Written Opinion for PCT application PCT/IL2012/050328, Issued by the EPO, mailing date Dec. 21, 2012.
Supplementary European Search Report for Application No. EP 11 73 1739, mailed Aug. 7, 2013.

\* cited by examiner

SYSTEM AND METHOD FOR TRANSACTION SECURITY RESPONSIVE TO A SIGNED AUTHENTICATION

CROSS-REFERENCE TO RELATED APPLICATIONS

This application claims priority from: U.S. Provisional Patent Application Ser. No. 61/669,084 filed 8 Jul. 2012, entitled "System and Method for Secure Out of Band Login". Additionally, this application is a continuation in part of International Application S/N PCT/IL2012/050199 filed 7 Jun. 2012, entitled "System and Method for Performing a Secure Transaction", which claims priority from: U.S. Provisional Patent Application Ser. No. 61/494,946 filed Jun. 9, 2011 entitled "SYSTEM AND METHOD FOR PERFORMING A SECURE TRANSACTION"; U.S. Provisional Patent Application Ser. No. 61/504,754 filed Jul. 6, 2011 entitled "SYSTEM AND METHOD FOR PERFORMING A SECURE TRANSACTION"; U.S. Provisional Patent Application Ser. No. 61/529,258 filed Aug. 31, 2011 entitled "METHOD AND APPARATUS FOR SECURE TRANSACTIONS WITH A MOBILE DEVICE"; and U.S. Provisional Patent Application Ser. No. 61/566,660 filed Dec. 4, 2011 entitled "SYSTEM AND METHOD FOR SECURE TRANSACTION PROCESS VIA MOBILE DEVICE". This application is further a continuation in part of International Patent Application S/N PCT/IL2012/050178 filed 16 May 2012, entitled "SYSTEM AND METHOD FOR PERFORMING A SECURE TRANSACTION", which claims priority from U.S. Provisional Patent Application Ser. No. 61/486,866 filed 17 May 2011, entitled "SYSTEM AND METHOD FOR PERFORMING A SECURE TRANSACTION". This application is further a continuation in part of U.S. patent application Ser. No. 13/442,861 filed 10 Apr. 2012, entitled "System and Method for Secure Transaction Process Via Mobile Device". The contents of all of the above mentioned applications are incorporated herein by reference.

TECHNICAL FIELD

The present disclosure relates generally to the field of security and in particular to a system and method for performing a secure transaction responsive to a received signed authentication based on a user's mobile device.

BACKGROUND ART

As the amount of online presence of individuals continues to increase, identity theft is rapidly becoming a major problem. Most user have difficulty maintaining a strict regimen of regularly changed strong passwords, leading to a situation where an easily guessed, or misappropriated, password may be utilized to gain access to another users private information.

Furthermore, software arranged to steal passwords, has been developed, with a sole intent of misappropriating passwords. Such fraudster software has become quite sophisticated in its approach, with multiple angles of attack.

Mobile devices (MDs) are increasingly being used for more than voice communication due to their ubiquity, available screen and input devices. An MD as used herein includes any electronic MD used for personal functionalities such as multimedia playing, data communication over a network or voice communication. One embodiment of an MD is a mobile station, also known as a mobile communication device, mobile phone, mobile telephone, hand phone, wireless phone, cell phone, cellular phone, cellular telephone, mobile handset or cell telephone.

With the development of IEEE 802.11, and the broad establishment of the resultant wireless networks, various MDs have been developed which communicate over available wireless networks in addition to cellular telephone capabilities. Furthermore, various MDs have been developed with the ability to access the Internet both over a wireless network and/or over a cellular network.

The location of an MD in real time is rapidly become a standard feature in MD technology. In certain embodiments, the location of an MD is identified responsive to real time positioning equipment within the MD, or in communication therewith, such as a global positioning system (GPS) peripheral. In other embodiments, the location of an MD is identified responsive to multilateration from a number of antennas, or by determination of network connection information.

The incidence of identity theft has rapidly become a source of major concern. The increase sophistication of fraudulent software, and the increased prevalence of electronic identification, has combined to make this a major threat to the increased use of electronic transactions.

What is needed, and is not provided by the prior art, is a system and method for providing security for transactions, preferably without requiring a strict password regimen. Furthermore, such a system and method is preferably hardened against fraudster software, and preferably executes on line without excessive delay. Preferably, such a system provides for positive identification of a user.

SUMMARY OF INVENTION

In view of the discussion provided above and other considerations, the present disclosure provides methods and apparatus to overcome some or all of the disadvantages of prior and present methods of performing a secure transaction based on mobile centric user identification. Other new and useful advantages of the present methods and apparatus will also be described herein and can be appreciated by those skilled in the art.

In an exemplary embodiment an authentication server (AS) is provided, and a user MD is provided with a verification application (VA). At an initial registration stage, the user associates a user ID, and optionally other identification information with a user MD, particularly include an address for the user MD, preferably further including a hardware and/or software fingerprint. The user further registers one or more service providers with the AS, and optionally instructs the SP to only allow access for the user responsive to a signed authentication by the AS, thus ensuring controlled access to the SP. In particular, in certain embodiments the selected service providers are instructed to not allow access without accreditation by the AS.

To access a selected SP, in one embodiment a user logs in to the AS utilizing the user MD, and selects the desired SP for which access is requested. Access to the AS may be password controlled. Access to the SP is provided responsive to present and historical information regarding one of the user mobile device and an additional user device in communication with the AS.

In one embodiment, upon access of the AS by the user MD, the AS transmits to user MD particularly to the verification application running thereon a token. In a preferred embodiment, the token is transmitted to the user MD via a notification server (NS) in an out of band (OOB) procedure, which thus ensures that the user MD is the user MD specified in the registration stage.

Upon receipt of the token, the user MD verification application responds by transmitting to the AS a digitally signed copy of the token, or other digitally signed authentication which is a function of the token, along with an identifier of the user MD. The digital signature is responsive to a key. Preferably location information and/or a hardware and/or a software fingerprint are further transmitted. The digitally signed authentication received by the AS is verified, preferably by decrypting the digitally signed authentication utilizing a key stored on the AS to confirm that the received digitally signed authentication is a function of the transmitted token. Thus a closed confirmation is provided by the AS, comprising the transmission of a token to an address defined by the registered user MD, and the receipt a digitally signed authentication, which is a function of the token, comprising an identifier of the registered user MD. Furthermore the hardware and/or software fingerprint and/or location information provides present information regarding the user mobile device, and is compared with stored historical data regarding the user mobile device and user locations. Consonance confirms that the user mobile device is the registered user mobile device and the user is the registered user The AS then transmits a digitally signed authorization to the SP via user MD, which is used in the SP access verification process. The digitally signed authorization is preferably responsive to a key shared with the SP, and is thus decrypted by the desired SP. The AS digitally signed authorization may represent a plurality of levels indicative of the level of security required by the SP.

In one embodiment, the location of the user MD defines a predetermined physical range of space. Other user devices may be authorized responsive to being identified as being within the predetermined range of the user MD.

In certain embodiments, the VA is provided with a human verification module arranged to verify that access by user MD is responsive to a human and not to nefarious software. In certain embodiments, biometric identification is further provided by the verification application, thus enhancing the level of security. As indicated above, the level of security is reported as part of the digitally signed authorization.

In another embodiment, the user MD is provided with a security control ensuring that any passcode information is encrypted prior to being received by a processor of the user MD. This prevents key logging software from reading a passcode, or other personal information number (PIN). In yet another embodiment, the AS transmits an image of a keypad for display on a touch screen, the keypad may be specifically designed responsive to a user passcode. In such an embodiment, the verification application of the user MD provides only coordinate information to the AS reflects received input information for the user passcode thus enhancing the level of security.

In another embodiment, the user MD provide to the AS a list of the recent historical interactions with the user MD. Such interaction may include the latest phone call numbers and durations, and/or the latest SMS parameters, which in light of historical information is a factor in generating a security risk score. As indicated above, the level of security is reported as part of the digitally signed authorization.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2A illustrates a high level block diagram of an embodiment of transaction system wherein access to an additional user device, and access to an SP from the additional user device is authenticated by an AS responsive to the user MD, wherein the user device is further preferably provided with an application responsive to the AS;

FIG. 3A illustrates a high level block diagram of an embodiment of transaction system wherein access from an additional user device to a service provider is initiated by a user MD responsive to an AS;

DESCRIPTION OF EMBODIMENTS

Figure 1A:
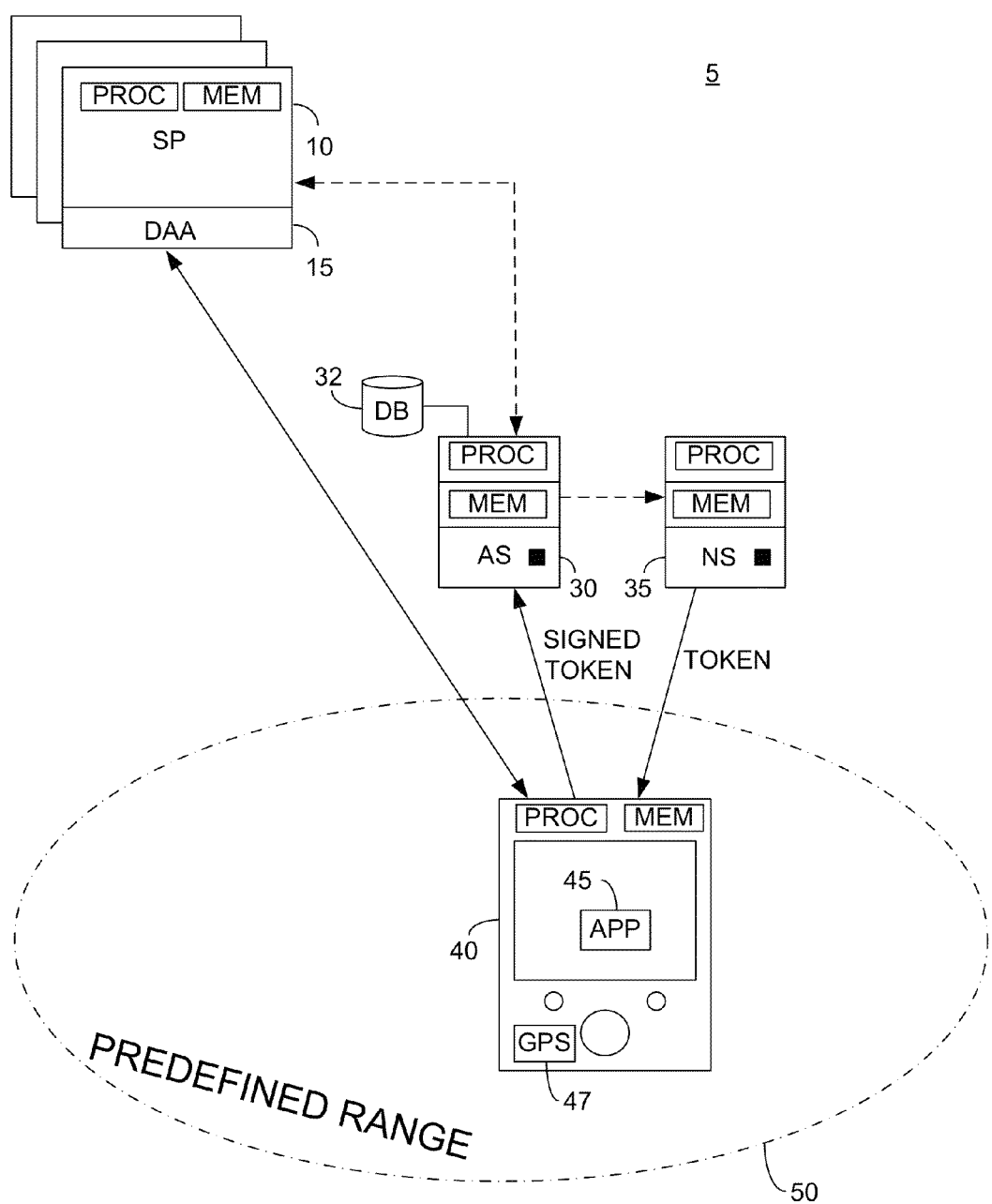
FIG. 1A illustrates a high level block diagram of an embodiment of transaction system wherein access to an SP is authenticated by an AS in cooperation with a user MD.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term connected as used herein is not meant to be limited to a direct connection and includes communication of any sort, and allows for intermediary devices or components without limitation.

In the following description, the term mobile device (MD) includes any electronic mobile device used for personal functionalities such as multimedia playing, data communication over a network or voice communication, including but not limited to a mobile station. For clarity, the term mobile station refers to any mobile communication device, mobile phone, mobile telephone, hand phone, wireless phone, cell phone, cellular phone, cellular telephone, cell telephone, or other electronic device used for mobile voice or data communication over a network of base stations. Although in the following description, communication is described in certain embodiments using an example of cellular communication, particularly, global system for mobile communication (GSM), it will be understood that the scope of the invention is not limited in this respect, and that the communication method used may be based on any suitable communication protocol, including without limitation, Universal Mobile Telecommunications System (UMTS), IEEE 802.11, IEEE 802.16x and CDMA.

The terms "decrypted" and "decoded" are used interchangeably and have the same meaning throughout this document. Similarly, the terms "encrypted" and "encoded" are used interchangeably and have the same meaning throughout this document. The term "transaction" as used herein is meant to include financial transaction as well as logins to various web sites, without limitation.

The terms password, passcode and personal information number (PIN) are used herein interchangeably and have the same meaning throughout this document.

Machine readable instructions, alternatively named computer readable instructions, as used throughout are indicative of instructions stored on a machine readable memory in communication with the associated processor. The memory may be within the device, or held separately, such as in cloud computing. The computer readable instructions are non-transitory signals.

FIG. 1A illustrates a high level block diagram of an embodiment of transaction system 5 wherein access to an SP 10 is controlled for a user MD 40 responsive to an AS 30. Transaction system 5 further comprises an optional notification server 35 responsive to AS 30 and in communication with user MD 40. Each of user MD 40, AS 30, notification server 35 and SP 10 has an associated processor, and an associated memory, the functionality and actions described herein below being performed by the relevant processor responsive to reading and executing computer readable instructions stored on the associated memory. A database (DB) 32 is provided in communication with AS 30. The associated memory may be within the device, or in communication therewith, without exceeding the scope. Each SP 10 is in communication with a digital approval authenticator (DAA) 15; multiple SPs 10 may share a single DAA 15 without exceeding the scope. User MD 40 has loaded thereon a user MD verification application 45 and optionally comprises a real time location peripheral 47, shown without limitation as a global positioning satellite (GPS) peripheral 47. A predefined range 50 about user MD 40 is defined as will be described below. Any user device, or MD, located within predefined range 50 is defined herein as having a location consonant with the location of user MD 40, it being understood that the term location refers to location information as developed by GPS peripheral 47, or by multilateration or by any other method, including without limitation determining the location of a Wi-Fi access point in communication with user MD 40, or the existence of a Wi-Fi direct link with a device of known location, or within a predetermined range.

Notification server 35 is in communication with AS 30, however typically NS 35 is independent of AS 30. Notification server 35 is in communication with user MD 40, and is arranged to provide the transmission of messages to user MD 40 for AS 30 as known to those skilled in the art. In particular, notification server 35 communicated with user MD 40 over a different logical communication link than the communication link between user MD 40 and AS 30. The use of different logical communication links is frequently denoted out of band communication, irrespective as to whether the communication is over different frequency bands, or over a single frequency band, such as one used for Wi-Fi communications.

A plurality of SPs 10 are illustrated without limitation. User MD 40 comprises an entry device, such as a touch screen; a display; a processor; a memory; and a communication link which may be one or more of a cellular telephone link and a wireless local area network link. As indicated above user MD 40 is loaded with user MD verification application 45 running on the processor thereon and stored in a portion of the memory thereon. Notification server 35 is arranged to transmit notifications from AS 30 to user MD 40. User MD 40 is in communication with AS 30 and with SP 10. Optionally, as shown by the dotted line, SP 10 is in communication with AS 30. Notification server 35 is not required in all embodiments, but is illustrated to show how the present state of the art delivers such messages.

Figure 1B:
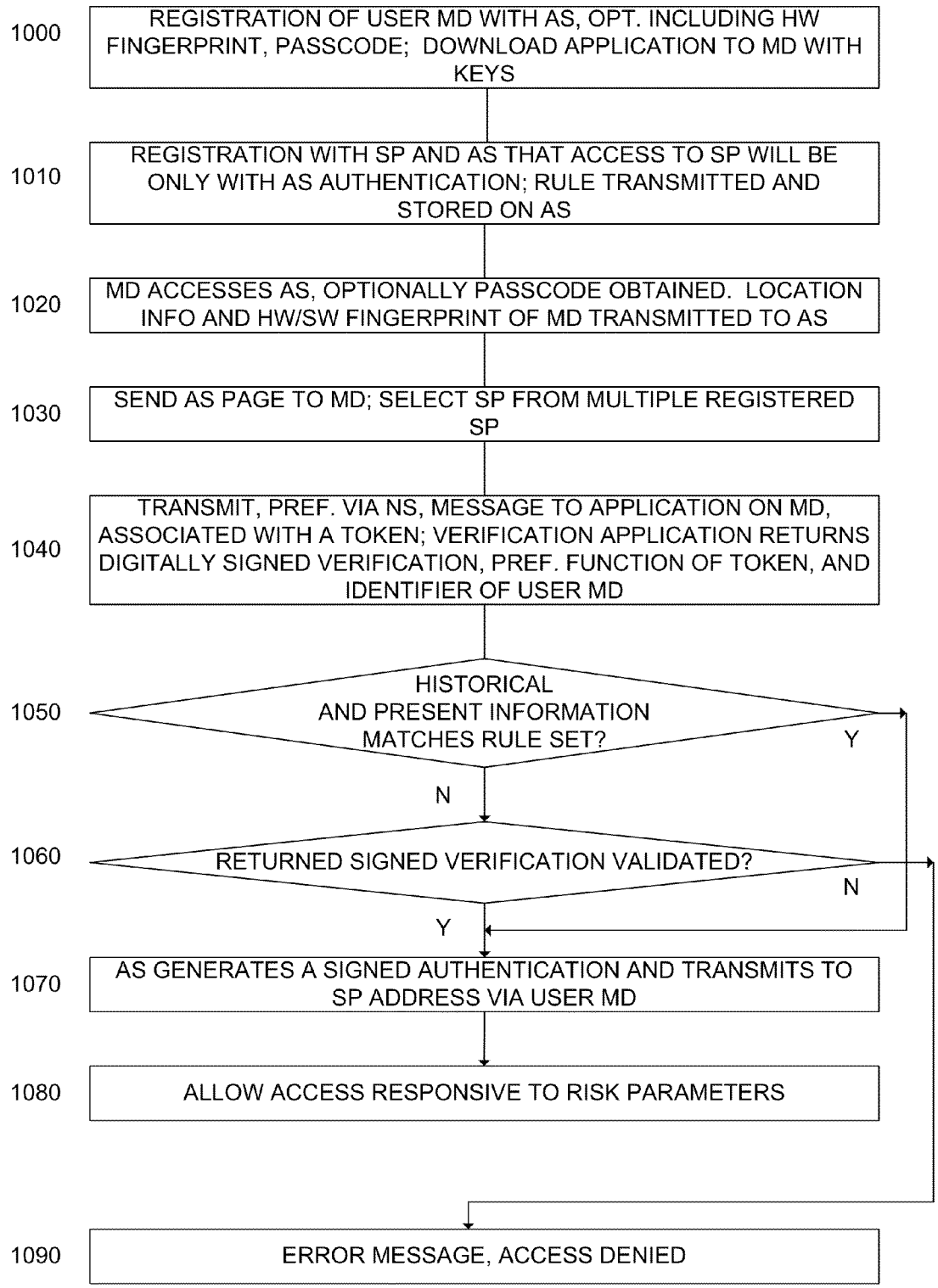
FIG. 1B illustrates a high level flow chart of an exemplary embodiment of the operation of the transaction systems of FIG. 1A to provide authenticated access to the SP responsive to the user MD.

FIG. 1B illustrates a high level flow chart of an exemplary embodiment of the operation of transaction system 5 of FIG. 1A to provide authenticated access to an SP, FIGS. 1A and 1B being described herein together for clarity.

In stage 1000, a user registers user MD 40 with AS 30, providing address information for user MD 40, such an MSISDN, and further optionally providing hardware and/or software fingerprint information so as to uniquely identify user MD 40 to AS 30, and an optional passcode. Such fingerprint information may comprise hardware configuration information, and/or serial number information for various subcomponents, and/or software without limitation. Such a fingerprint uniquely identifies user MD 40 to AS 30, and represents historical information regarding user MD 40. User MD verification application 45 is downloaded preferably from AS 30 to user MD 40, and arranged to preferably run automatically responsive to a communication from AS 30. User MD verification application 45 is preferably provided with one or more user MD encryption keys as will be described further below.

In stage 1010, the user further registers with one or more SP 10 and AS 30 that access is to be authorized to SP 10 responsive to authentication by AS 30. AS 30 and the selected SP 10 preferably exchange one or more provider keys. In one embodiment, access to SP 10 is thus only to be authorized with AS 30 authentication. The rule set defined by an authorized entity such as: SP 10, and/or the user of user MD 40, and/or a user administrator, defining the present and historical information required, and the level of authentication required by SP 10 is noted, and stored within AS 30. Stages 1000-1010 are performed initially, and only as required to add additionally SPs 10, however there is no need to regularly perform same.

In stage 1020, user MD 40 accesses AS 30, which may be performed as access to a web address of AS 30. Optionally, AS 30 requires a passcode for access, or alternately provides access to AS 30 without requiring a passcode under certain predetermined condition, or conditions, in accordance with the store rule set of stage 1010. In one embodiment, the predetermined condition is historical information such as that a previous login of user MD 40 to AS 30 has occurred with an approved password within a predetermined time frame. User MD verification application 45 provides location information if available from optional GPS peripheral 47, or alternately AS 30 develops location information, such as by multilateration. User MD verification application 45 further provides a hardware fingerprint of user MD 40, which is preferably compared to the registration hardware fingerprint of stage 1000 as will be described further below. Location information may be accurate, responsive to an on-board GPS device, or imprecise, developed responsive to multilateration or network information. The accuracy of the information is preferably determined by AS 30. All information received from user MD 40 is stored on DB 32, and thus builds a historical database of user MD 40.

The following will be described in an embodiment wherein a closed loop communication is further utilized to provide the signed authentication, however this is not meant to be limiting in any way. As indicated above, in an exemplary embodiment the rule set stored on AS 30 determines the provision of service to user MD 40.

In stage 1030, AS 30 presents user MD 40 with a user secure domain (USD) page for display on the display device thereof. In the event that multiple SPs 10 have been registered by user MD 40 with AS 30, AS 30 is arranged to display the USD page with multiple SPs 10 on the display device of user MD 40, and receive in return a selected SP 10, responsive to a user gesture to an input device of user MD 40.

In stage 1040, which may run simultaneously, before, or after, stage 1030, AS 30 transmits to the associated user MD 40, preferably via notification server 35, a message arranged to initiate user MD verification application 45 downloaded in stage 1000. AS 30 further transmits a token, preferably via notification server 35, which may be considered, and alternately called, a security token, to the initiated user MD verification application 45. The message and token may be sent as a single unified transmission without exceeding the scope. Use of notification server 35 advantageously provides OOB security, since the logical communication link of notification server 35 is independent of the data connection logical communication link between user MD 40 and the AS 30. User MD verification application 45 further functions to digitally sign the security token utilizing the keys stored within user MD verification application 45 and return the digitally signed security token to AS 30 as a verification message. There is no requirement that the actual token be directly digitally signed and returned, and a digitally signed verification message which is a function of the token is particularly contemplated. The digitally signed verification is transmitted along with an identifier of the user MD. In one embodiment, the location and hardware fingerprint information described above in relation to stage 1020 are transmitted with the digitally signed verification by user MD verification application 45. Preferably, stage 1040 runs silently without requiring user intervention. Location and hardware and/or software fingerprint information represent present information regarding user MD 40.

In stage 1050 AS 30 compares the hardware, and/or software fingerprint information of stage 1020, i.e. the present information regarding user MD 40, and the optional passcode of stage 1020, with any hardware and/or software fingerprint information, representing historical information regarding user MD 40, and passcode information of stage 1000. In the event that the present and historical information are consonant, i.e. the hardware fingerprint and/or optional software fingerprint matches the stored registration information, and optionally the passcode provided in stage 1020 matches the stored passcode of stage 1000, and/or the present location is consonant with historical location in stage 1070, all of the above being consonant in accordance with the rule set of stage 1010, a signed authentication is generated utilizing the exchanged provider keys of stage 1010. The generated signed authentication is transmitted to the address of the selected SP 10 via user MD 40. The generated signed authentication preferably includes information regarding the level of authentication. For example, has a standard passcode or a specialized passcode been utilized, or has biometric tests integrated with human authentication been performed. As will be discussed further below, each of these are preferably supported by AS 30, and implemented responsive to the requirements of the selected SP 10. Consonance in accordance with the rule set may: require an exact match, such as for a hardware fingerprint; allow for certain software upgrade information; require, or not require, the passcode; require or not require biometric tests; and define the parameters of location consonance—i.e. the geographic range which is considered to be consonant with historical information.

In the event that in stage 1050 historical and present information is insufficient, in accordance with the rule set of stage 1010, to generate the signed authorization of stage 1070, in stage 1060 the digitally signed verification message of stage 1040 is validated, in accordance with the keys of stage 1000. As described above, preferably the verification message is a function of the transmitted token. As indicated above, stage 1040 may run simultaneously, before, or after, stage 1030, and thus in one embodiment is run after the failure of stage 1050 to successfully result in the generation of the signed authorization of stage 1070. In the event that in stage 1060 the digitally signed verification message of stage 1040 is validated, stage 1070 as described above is performed.

Thus, in stage 1070, a signed authentication provided by AS 30 is transmitted to the selected SP 10 address via user MD 40. Advantageously, prior to accessing SP 10 authentication has already been performed according to SP 10 rules provided to AS 30, and thus time out issues for authentication are avoided. The signed authentication is thus generated responsive present and historical information regarding user MD 40, in accordance with the rule set stored on AS 30, and optionally further responsive to a closed loop consisting of AS 30 and user MD 40, preferably in cooperation with NS 35, and the transmitted token via NS 35 is reflected in the returned digitally signed verification of stage 1040. The transmission of the signed authentication received by user MD 40 from AS 30 directed to SP 10 is also known as injection. Preferably, since SP 10 has not exchanged keys with user MD 40, the received signed authentication is not further encrypted by user MD verification application 45.

In stage 1080, responsive to the exchanged keys of stage 1010, the received signed authentication of stage 1060 is validated. In the event that the received signed authentication of stage 1060 is validated, in stage 1090 access is allowed, preferably in accordance with the level of authentication indicated by the signed authentication of stage 1080. Optionally, SP 10 may require an additional password, or other security measure from user MD 40, in accordance with its security requirements and in light of the security level indicated by the received signed authentication of stage 1070.

In the event that in stage 1050 the historical and present information does not meet the stored rules set of stage 1010, or the passcode does not match, e.g. the hardware or software fingerprint information does not match, in stage 1090 AS 30 returns an error message to user MD 40 indicating that the request has failed and access is denied. Similarly, in the event that in stage 1060 the received signed verification message is not validated, or not received, in stage 1090 SP 10 returns an error message to user MD 40 indicating that the request has failed and access is denied. Thus the action of stage 1090 may alternately be performed by AS 30 and SP 10, without limitation.

Figure 2A:
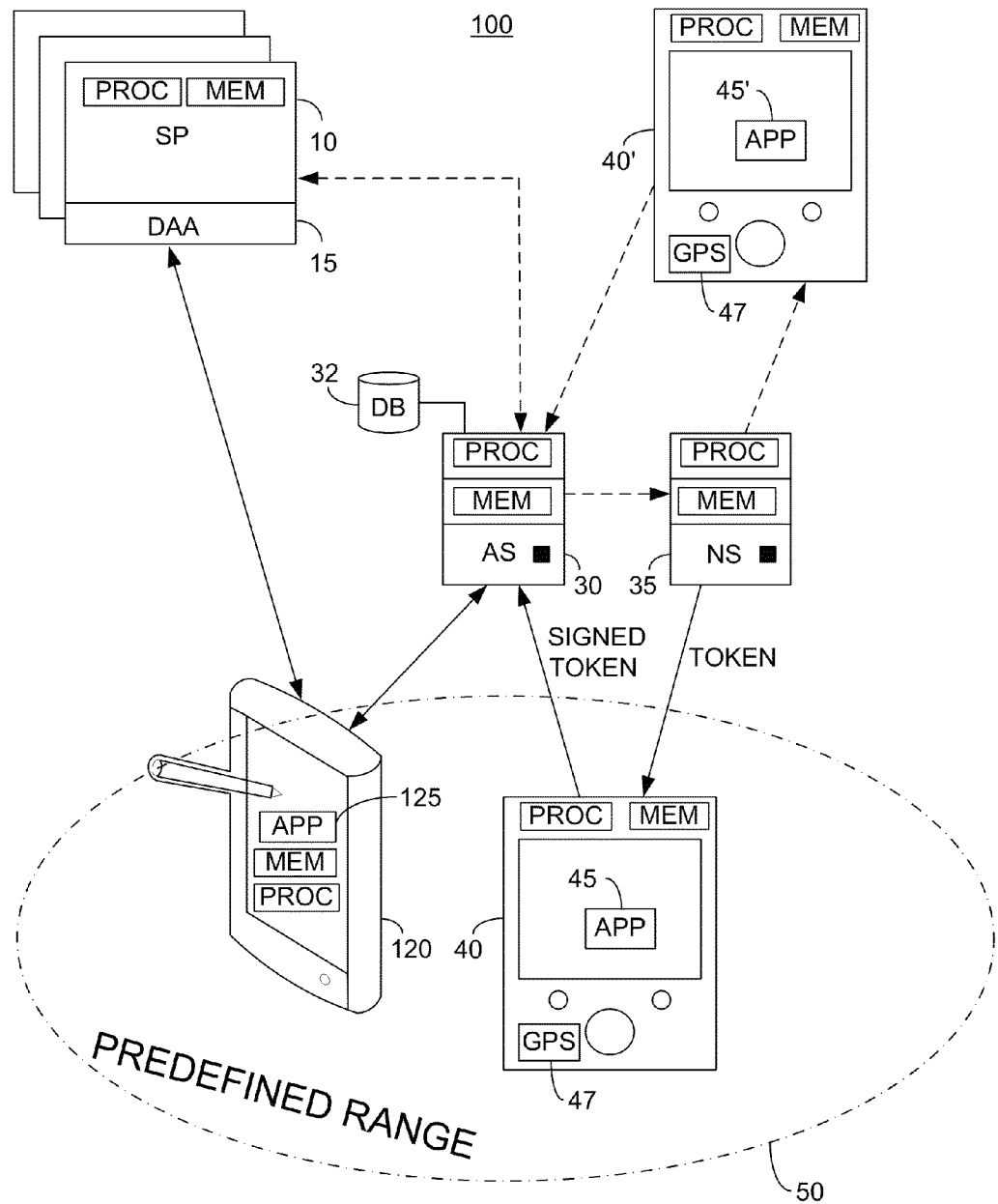

FIG. 2A illustrates a high level block diagram of an embodiment of transaction system 100 wherein access to an SP 10 is controlled for an additional user device (AUD) 120 responsive to a AS 30 and a user MD 40, wherein AUD 120 is further provided with an AUD verification application 125 responsive to the AS 30. AUD 120 is illustrated as being within predefined range 50, as will be explained further below. Optionally, a further authorization device 40' is provided, authorization device 40' in all respects identical with user MD 40, however there is no requirement for authorization device 40' to be within predefined range 50. Transaction system 100 is in all other respects identical with the transaction system 5, described above, and thus in the interest of brevity will not be further detailed. AUD 120 comprises a processor and an associated memory, which may be internal to AUD 120, or external thereof, the memory having loaded thereon computer readable instructions which when executed causes the associated processor to perform the functions described herein. Authorization device 40' comprises a processor and an associated memory, which may be internal to authorization device 40', or external thereof, the memory having loaded thereon computer readable instructions which when executed causes the associated processor to perform the functions described herein. AS 30 is in communication with DB 32, and stores thereon all received data, on an ongoing basis, for both user MD 40 and AUD 120, thus building a historical database, which as described below, is utilized in accordance with a stored rule set and present information to provide a signed authentication.

Figure 2B:
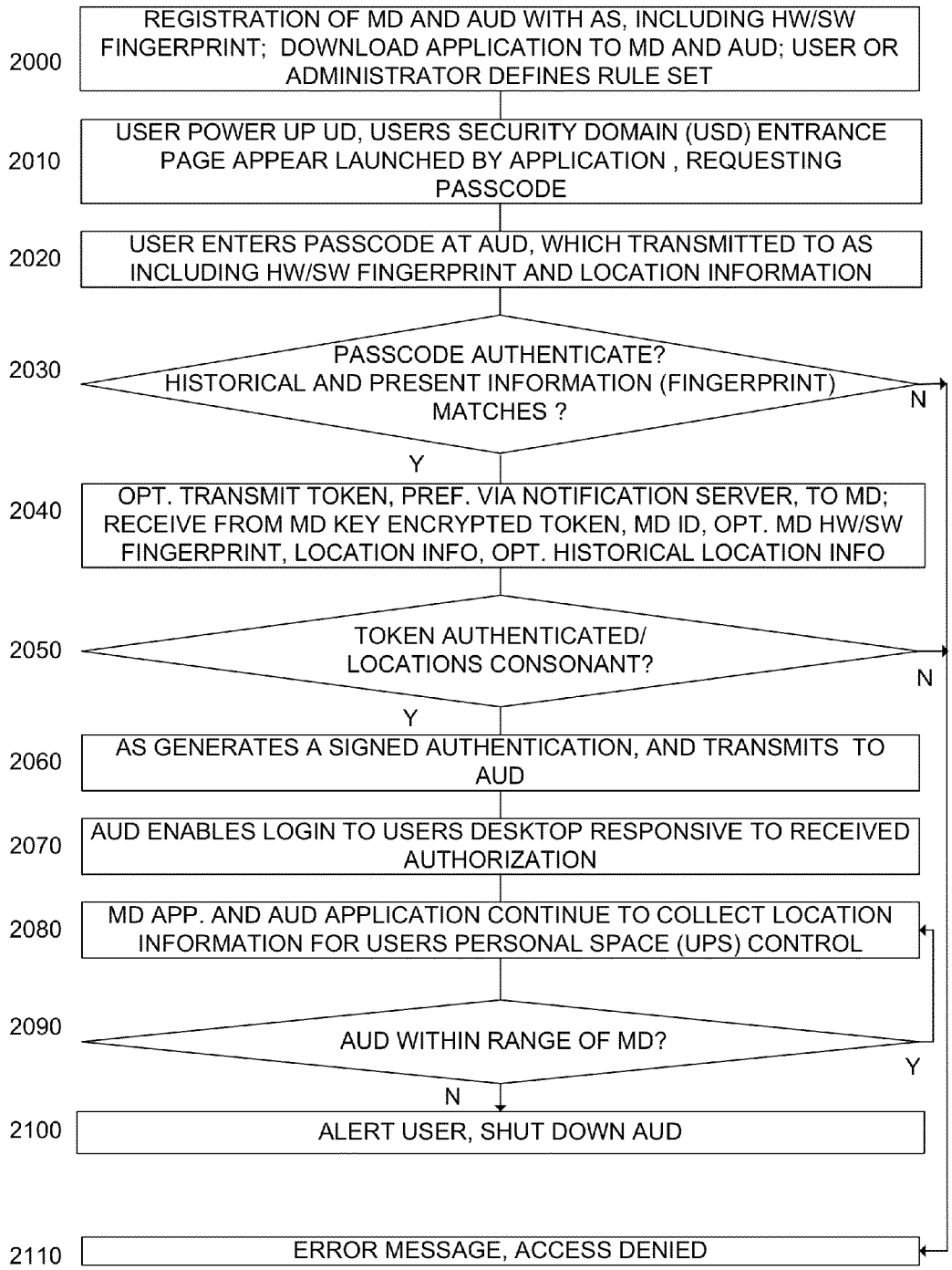
FIG. 2B illustrates a high level flow chart of an exemplary embodiment of the operation of the transaction systems of FIG. 2A to provide controlled access to the additional user device responsive to the user MD.

FIG. 2B illustrates a high level flow chart of an exemplary embodiment of the operation of the transaction systems of FIG. 2A to provide authenticated login, or access, to AUD 120 responsive to AS 30, FIGS. 2A and 2B being described herein together for brevity.

In stage 2000, both user MD 40 and AUD 120 are registered with AS 30. Preferably, for AUD 120, and optionally for user MD 40, a hardware and/or software fingerprint are further provided to AS 30 as part of the registration process. Such fingerprint information will represent historical information for AUD 120 and respectively optionally for user MD 40, at a later stage. A user ID for each are further provided and a passcode is provided at least for AUD 120. User MD verification application 45 is downloaded to user MD 40 and AUD verification application 125 is downloaded to AUD 120. In one embodiment, AUD verification application 125 and user MD verification application 45 share at least one key, to be utilized in the event that access to AS 30 is not available. AUD verification application shares at least one key with AS 30, as will be described further below. The address of user MD 40 over a communication network, such as a cellular network address is provided. The relationship between AUD 120 and user MD 40 is defined as part of the registration process. There is no requirement that the address of user MD 40 be over a cellular network, and the use of wireless data communication, both over Wi-Fi and over cellular is particularly contemplated herein. A rule set to allow access to at least one memory location or resource of AUD 120, which may provide access to certain software, is defined via user MD 40, AUD 120 or via an authorized administrator station in communication with AS 30.

In stage 2010, a user powers up AUD 120, however login to AUD 120 is restricted to requiring authorization by AS 30. This is typically accomplished by restricting access to at least one memory location or resource of AUD 120, although other methods may be utilized without exceeding the scope. Thus, AUD verification application 125 is initialized prior to login authorization, and a user's security domain (USD) entrance screen appears on a display device of AUD 120, responsive to AUD verification application 125. The USD entrance screen preferably requests a user passcode, and is entered by the user. In stage 2020, responsive to a user gesture at an input device of AUD 120, AUD verification application 125 transmits the entered passcode of stage 2010 to AS 30, which represents present information, preferably encoded. Further preferably, the present hardware and/or software fingerprint of AUD 120 is further transmitted, which further represents present information for AUD 120. AS 30 further obtains location information for AUD 120, which may be transmitted by AUD 120 responsive to an onboard location information equipment, or may be obtained from network resources as described above. Location information similarly represents present information for AUD 120. The received information is stored on DB 32, thus developing a historical database of fingerprints and location information.

In stage 2030, responsive to the transmission of stage 2020, the optional passcode is compared with the registered passcode of stage 2000, and furthermore the hardware and/or software fingerprint received are compared with the registered hardware and/or software fingerprint. In the event that the passcode and respective fingerprints match, in stage 2040 responsive to the present and historical information, AS 30 optionally transmits a token to user MD 40, also known as a security token, preferably via NS 35, responsive to the cellular network address information of stage 2000. Stage 2040 is run responsive to the rule set of stage 2000 and the historical and present information received, and thus in certain instances may not be required. In response to the transmitted token, user MD versification application 45 functions to digitally sign the security token utilizing the keys stored within user MD verification application 45 and returns the digitally signed security token to AS 30. There is no requirement that the actual token be directly digitally signed and returned, and a digitally signed verification message which is a function of the token is particularly contemplated. The digitally signed verification message is transmitted along with an identifier of the user MD 40. The location, hardware fingerprint information, and/or software fingerprint information described above in relation to stage 2000 are transmitted with the digitally signed verification message by user MD verification application 45. Preferably, stage 2040 runs silently without requiring user intervention. Transmission of the digitally signed authentication is preferably not over the same band, i.e. logical communication link, of the received security token.

Location information may be accurate, responsive to an on-board GPS device, or imprecise, developed responsive to network information. The accuracy of the information is determined by AS 30, and the location information is compared to the stored rule set of stage 2000. Optionally, such as when communication with one of user MD 40 and AUD 120 is not consistent with AS 30, or when up-to-date location information for one of user MD 40 and AUD 120 is not available, historical information from DB 32 may be utilized. For example, the last known location, or the historical normative location of the device for which up-to-date location information is not available may be utilized in place of up-to-date location information, responsive to the rule set of stage 2000. Preferably, the particular historical information utilized is notified to SP 10, which may determine whether such historical information matches the acceptable security profile.

In stage 2050, the optional received digitally signed authentication from user MD verification application 45 is decrypted by AS 30 and authenticated. Hardware and/or software fingerprint information for user MD 40 are further optionally authenticated, as described above to provide one embodiment of present and historical information. The location information for user MD 40 is compared with the location information for AUD 120, to confirm that user MD 40 and AUD 120 are within a predefined range of one another to provide one embodiment of present information. Optionally, one or both of user MD 40 and AUD 120 are restricted to be within a predefined geographical locale which is preferably achieved responsive to location information determined from Wi-Fi direct communication between AUD 120 and user MD 40 at AS 30. Wi-Fi direct communication is advantageously physically constrained to work over only a predetermined range, and thus in certain embodiments active Wi-Fi direct communication acts as confirmation that AUD 120 and user MD 40 are within predefined range 50, which may thus be defined as the Wi-Fi direct communication range. In certain embodiments a complete list of devices which are in active communication with user MD 40 optionally AUD 120 are reported to AS 30, and thus the existence of the Wi-Fi direct communication may be determined by AS 30. In the event that the received digitally signed authentication from user MD verification application 45 is successfully authenticated, and user MD 40 and AUD 120 are within the predefined range of one another, in stage 2060 AS 30 generates a digitally signed authorization, and transmits the generated to AUD 120, where it is received by AUD verification application 125.

AUD verification application 125, responsive to the received digitally signed authorization, authenticates the received digitally signed authorization, responsive to one or more keys stored thereon, and in the event of a successful authentication, AUD verification application 125 enables login for AUD 120. Thus, AUD 120 is unable to function, or is only able to provided limited functionality, or access to at least one memory location or resource is blocked by AUD verification application 125 in the absence of the received digitally signed authorization.

In stage 2080, user MD verification application 45 and AUD verification application 120 continually, or periodically, or responsive to input information, monitor location information, and advise AS 30 of any changes. Thus, for example, in an embodiment where user MD 40 is not provided with GPS peripheral 47, movement of user MD 40 is recorded by user MD verification application 45 and change of location information is developed by user MD verification application 45 and/or AS 30 responsive to the movement information. The location information may be developed from location identifiers such as multilateration or Wi-Fi direct. The ongoing location information ensures that a user's personal space (UPS), which is defined by the predetermined range allowed between user MD 40 and AUD 120.

In stage 2090, in the event that AUD 120 is within the predefined range of MD 40, i.e. within the UPS, stage 2080 is again performed. In the event that in stage 2090 AUD 120 is not within the predefined range of MD 40, i.e. AUD 120 has left the UPS, in stage 2100 AS 30 sends an alert message to AUD 120, which is displayed on a display device of AUD 120 by AUD verification application 125, and/or an audio alert is output by AUD 120. Optionally a similar alert is sent to user MD 40. After a predetermined time period, access to at least one memory location or resource of AUD 120 is disabled. In one embodiment, AUD 120 is shut down, and thus access to AUD 120 is disabled.

In the event that in stage 2030 the passcode is not authenticated, or the hardware and/or software fingerprint does not match, in stage 2110 an error message is displayed on AUD 120 by AUD verification application 125 and access is denied. In the event that in stage 2050 the locations are not consonant, i.e. AUD 120 is not within the UPS of user MD 40, or the received digitally signed authentication from user MD verification application 45 is not authenticated, in stage 2110 an error message is displayed on AUD 120 by AUD verification application 125 and access is denied.

In the event that AS 30 is not available, in one embodiment, user MD 40 may communicate directly with AUD 120 and provide access. Such communication may be performed by user MD verification application 45 utilizing Wi-Fi direct, or via an encrypted communication. In such an embodiment, user MD 40 generates the digitally signed authorization responsive to a user gesture to an input device of user MD 40, optionally requiring passcode input. AUD verification application 125 authenticates the received digitally signed authentication using at least key shared with AS 30, as described above.

Figure 2C:
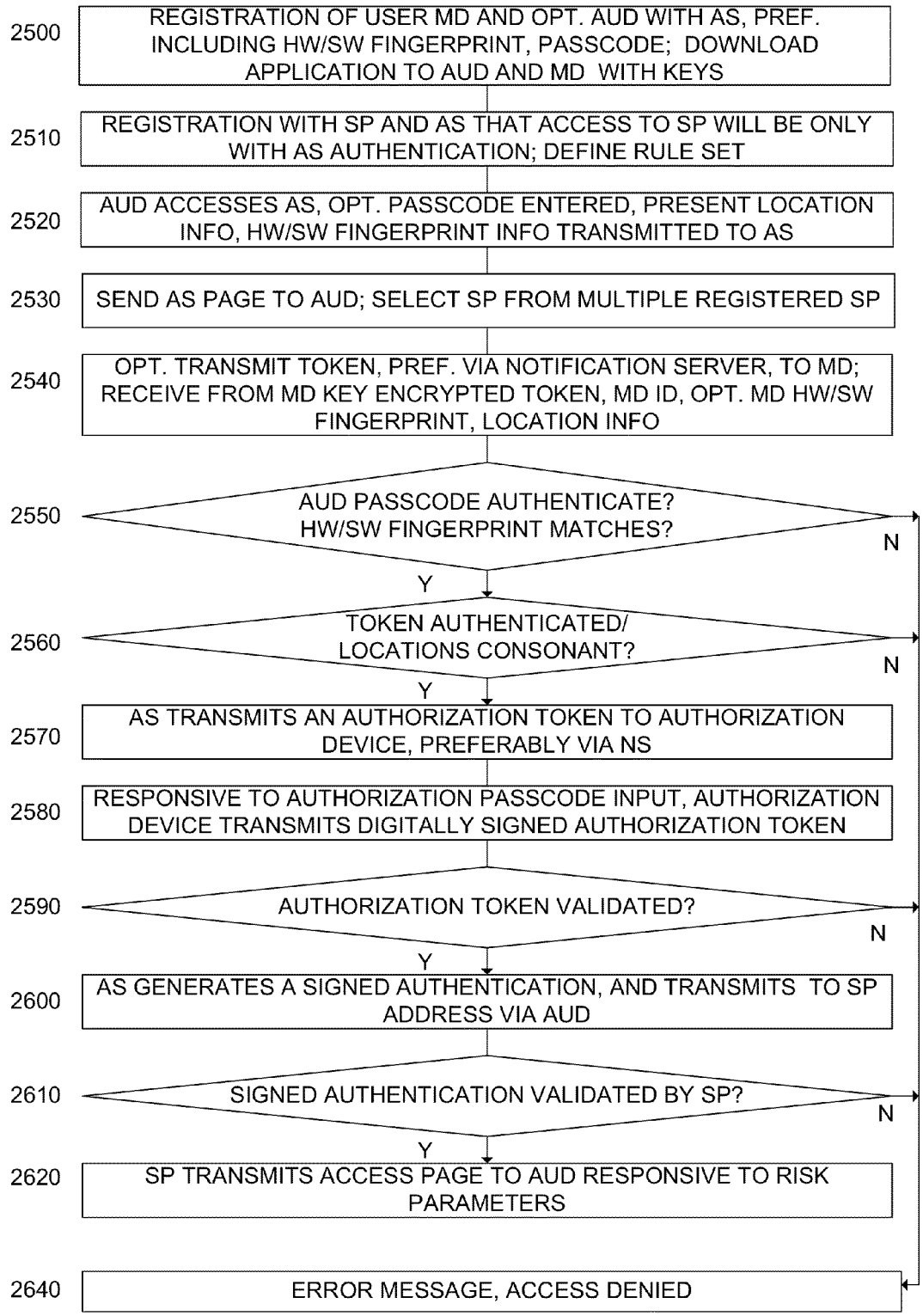
FIG. 2C illustrates a high level flow chart of an exemplary embodiment of the operation of the transaction systems of FIG. 2A to provide authenticated access to the service provider for the additional user device responsive to the user MD, further optionally responsive to an authorization device.

FIG. 2C illustrates a high level flow chart of an exemplary embodiment of the operation of transaction system 100 of FIG. 2A to provide authenticated access to SP 10 for AUD 120 responsive to user MD 40, further optionally responsive to authorization device 40'.

In stage 2500, a user registers user MD 40 with AS 30, providing address information for user MD 40, such an MSISDN, and further optionally providing hardware and/or software fingerprint information so as to uniquely identify user MD 40 to AS 30, thus providing information to be used as historical information, and an optional passcode. Furthermore, an AUD is registered and associated with user MD 40, and optionally an authorization device 40'. User MD verification application 45 is downloaded from AS 30 to user MD 40, and arranged to preferably run automatically responsive to a communication from AS 30. User MD verification application 45 is preferably provided with one or more user MD encryption keys as will be described further below. Authorization application 45' is preferably downloaded from AS 30 to authorization device 40'. AUD verification application 125 is preferably downloaded from AS 30 to AUD 120, and arranged to preferably run automatically responsive to a communication from AS 30.

In stage 2510, the user further registers with one or more SP 10 and AS 30 that access is to be authorized to SP 10 responsive to authentication by AS 30. AS 30 and the selected SP 10 preferably exchange one or more provider keys. In one embodiment, access to SP 10 is thus only to be authorized with AS 30 authentication. The level of authentication required by SP 10 is noted, and stored within AS 30. Stages 2500-2510 are performed initially, and only as required to add additionally SPs 10, however there is no need to regularly perform same. A rule set to allow authenticate access to SP 10, is defined via SP 10, user MD 40, AUD 120 or via an authorized administrator station in communication with AS 30. In the event that user MD 40, AUD 120 or an authorized administrator station has provided the rule set, SP 10 preferably has first transmitted an authorization to allow such a designation.

In stage 1520, AUD 120 accesses AS 30, which may be performed as access to a web address of AS 30. Optionally, responsive to the rule set of stage 1510 AS 30 requires a passcode for access, or alternately provides access to AS 30 without requiring a passcode under certain predetermined conditions, which are based on present and historical data regarding one of AUD 120 and user MD 40. In one embodiment, the predetermined condition is in the event that a previous login of AUD 120 to AS 30 has occurred with an approved password within a predetermined time frame. AUD verification application 125 provides location information if available from optional GPS peripheral 47, or alternately AS 30 develops location information, such as by multilateration. AUD verification application 125 further provides a hardware and/or software fingerprint of AUD 120 thus providing present information regarding AUD 120. Location information may be accurate, responsive to an on-board GPS device, or imprecise, developed responsive to multilateration or network information. The accuracy of the information is preferably determined by AS 30. The precise data required is determined in accordance with the rule set of stage 2510. All received data from AUD 120 is stored on DB 32, thus providing a historical database of information regarding AUD 120.

In stage 2530, AS 30 presents AUD 120 with a user secure domain (USD) page for display on the display device thereof. In the event that multiple SPs 10 have been registered by AUD 120 with AS 30, AS 30 is arranged to display the USD page with multiple SPs 10 on the display device of AUD 120, and receive in return a selected SP 10, responsive to a user gesture to an input device of AUD 120.

In optional stage 2540, which may run simultaneously, before, or after, stage 2530, and is responsive to the requirements of the rule set of stage 2510, AS 30 transmits to the associated user MD 40, preferably via notification server 35, a message arranged to initiate user MD verification application 45 downloaded in stage 2500. AS 30 further transmits a token, preferably via notification server 35, which may be considered, and alternately called, a security token, to the initiated user MD verification application 45. The message and token may be sent as a single unified transmission without exceeding the scope. Use of notification server 35 advantageously provides OOB security, since the logical data link of notification server 35 to user MD 40 is independent of the logical data link between user MD 40 and the AS 30. User MD verification application 45 further functions to digitally sign the security token utilizing the keys stored within user MD verification application 45 and return the digitally signed security token to AS 30 as a verification message. There is no requirement that the actual token be directly digitally signed and returned, and a digitally signed authentication which is a function of the token is particularly contemplated. The digitally signed verification message is transmitted along with an identifier of the user MD 40. The location, hardware and/or software fingerprint information for user MD 40 are transmitted with the digitally signed verification message by user MD verification application 45. Preferably, stage 2540 runs silently without requiring user intervention. Location information, if not transmitted, is developed and obtained from network resources by AS 30.

In stage 2550 AS 30 compares the hardware, and/or software fingerprint information of stage 2540, and the optional passcode of stage 2520, with any hardware and/or software fingerprint information and passcode information of stage 2500, thus comparing present and historical information for user MD 40. In the event that the AUD passcode of stage 2520, and the hardware and/or software fingerprint information matches, in stage 2560 AS 30 further decrypts the digitally signed verification message of stage 2540 with the keys of stage 2500 and validates the received digitally signed verification message of stage 2540. Location information for AUD 120 and user MD 40 are compared to ensure that they are consonant within a predetermined range, i.e. is AUD 120 within the UPS of user MD 40. Location consonance is an embodiment of present information for each of AUD 120 and user MD 40.

In the event that in stage 2560 the received digitally signed authentication of stage 2540 is validated, and AUD 120 is within the UPS of user MD 40, optionally in stage 2570 AS 30 generates and transmits an authorization token to authorization device 40', preferably via NS 35. In stage 2580, authorization application 45' on board authorization device 40' initiates and request an authorization from a user of authorization device 40'. Responsive to an input gesture received at authorization device 40', such as a passcode, authorization application 45' generates and transmits a digitally signed authorization token to AS 30.

In stage 2590, the received digitally signed authorization token of stage 2580 is validated by AS 30, utilizing keys exchanged as part of the registration stage of stage 2500.

Stages 2570-2590 provide increased security requiring an additional authorization for access, and thus are optional, only being required in accordance with the rule set of stage 2510, which may require those steps under certain conditions for improved security.

In stage 2600, AS 30 generates a signed authentication utilizing the exchanged provider keys of stage 2510. The generated signed authentication is transmitted to the address of the selected SP 10 via AUD 120 preferably by a security assertion markup language (SAML) protocol. In other embodiment, in the event that SP 10 and AUD 120 are in communication via a virtual private network (VPN), the generated signed authentication is transmitted directly to the SP 10 on a secured channel preferably a VPN. The generated signed authentication preferably includes information regarding the level of authentication. For example, has a standard passcode or a specialized passcode been utilized, has an authorization device 40' provided a digitally signed authorization token or has biometric tests integrated with human authentication been performed. As will be discussed further below, each of these are preferably supported by AS 30, and implemented responsive to the requirements of the selected SP 10. While this information is transmitted to SP 10, preferably simultaneously AS 30 transmits to AUD 120 preferably a link to connect to the SP 10 access page. The SP 10 access page allows SP 10 to ask for additional information, or a passcode, or to take additional security measures. It is to be understood that the digitally signed authorization token has been transmitted responsive to the rule set of stage 2510. SP 10 may allow AS 30 to provide full security responsive to the rule set, or may only allow access with additional security measures in certain circumstance responsive to AS 30. Thus, for example, AS 30 may allow access responsive to historical information, such as a recent logon to a high security server, and SP 10, responsive to the requested transaction, may require an additional password, without exceeding the scope.

Thus, in stage 2600, a signed authentication provided by AS 30 is transmitted to the selected SP 10 address via AUD 120, or directly to SP 10, as described above. Advantageously, prior to accessing SP 10 authentication has already been performed according to SP 10 rules provided to AS 30 in stage 2510, and thus time out issues for authentication are avoided.

The signed authentication is thus generated responsive to historical and present information for one of user MD 40' and AUD 120, and optionally further responsive to a closed loop consisting of AS 30 and user MD 40, preferably in cooperation with NS 35, and the transmitted token via NS 35 is reflected in the returned digitally signed authentication of stage 2540. Preferably, since SP 10 has not exchanged keys with AUD 120, the received signed authentication is not further encrypted by AUD verification application 125.

In stage 2610, responsive to the exchanged keys of stage 2510, the received signed authentication of stage 2600 is validated. In the event that the received signed authentication of stage 2600 is validated, in stage 2620 access by AUD 120 to SP 10 is allowed, preferably in accordance with the level of authentication indicated by the signed authentication of stage 2600. Optionally, SP 10 may require an additional password, or other security measure from AUD 120, in accordance with its security requirements and in light of the security level indicated by the received signed authentication of stage 2600, as described above.

In the event that in stage 2550 the hardware or software fingerprint information does not match, or the passcode does not match, or in stage 2560 the returned digitally signed authentication of stage 2540 is not validated, or the locations of AUD 120 and user MD 40 are not within the predetermine range, in stage 2640 AS 30 returns an error message to AUD 120, and optionally to user MD 40 indicating that the request has failed and access is denied. Similarly, in the event that in 2590 the authorization toke in not validated, or in stage 2610 received signed authentication is not validated, in stage 2640 AS 30 returns an error message to AUD 120, and optionally to user MD 40 indicating that the request has failed and access is denied.

Figure 3A:
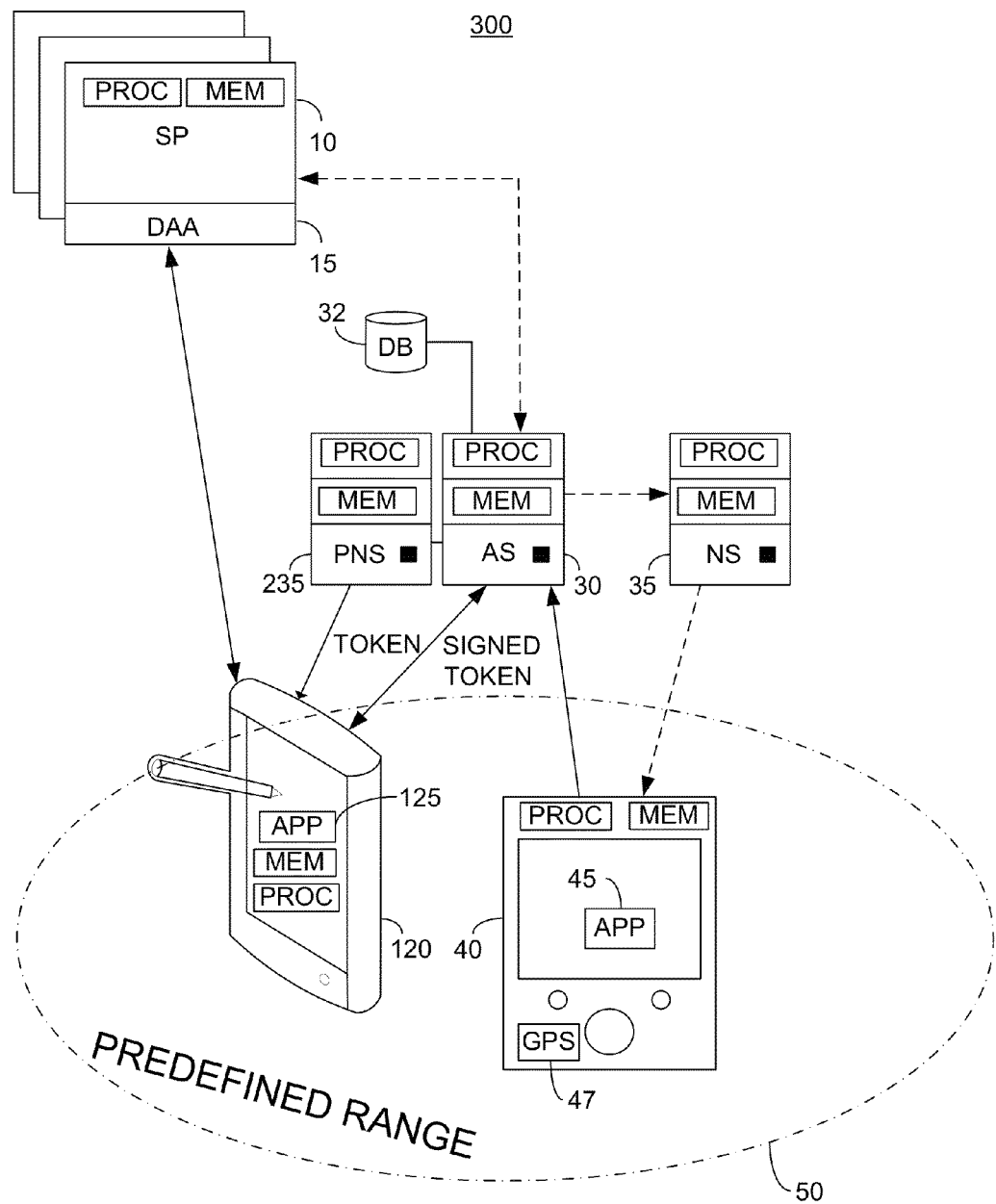
Figure 3B:
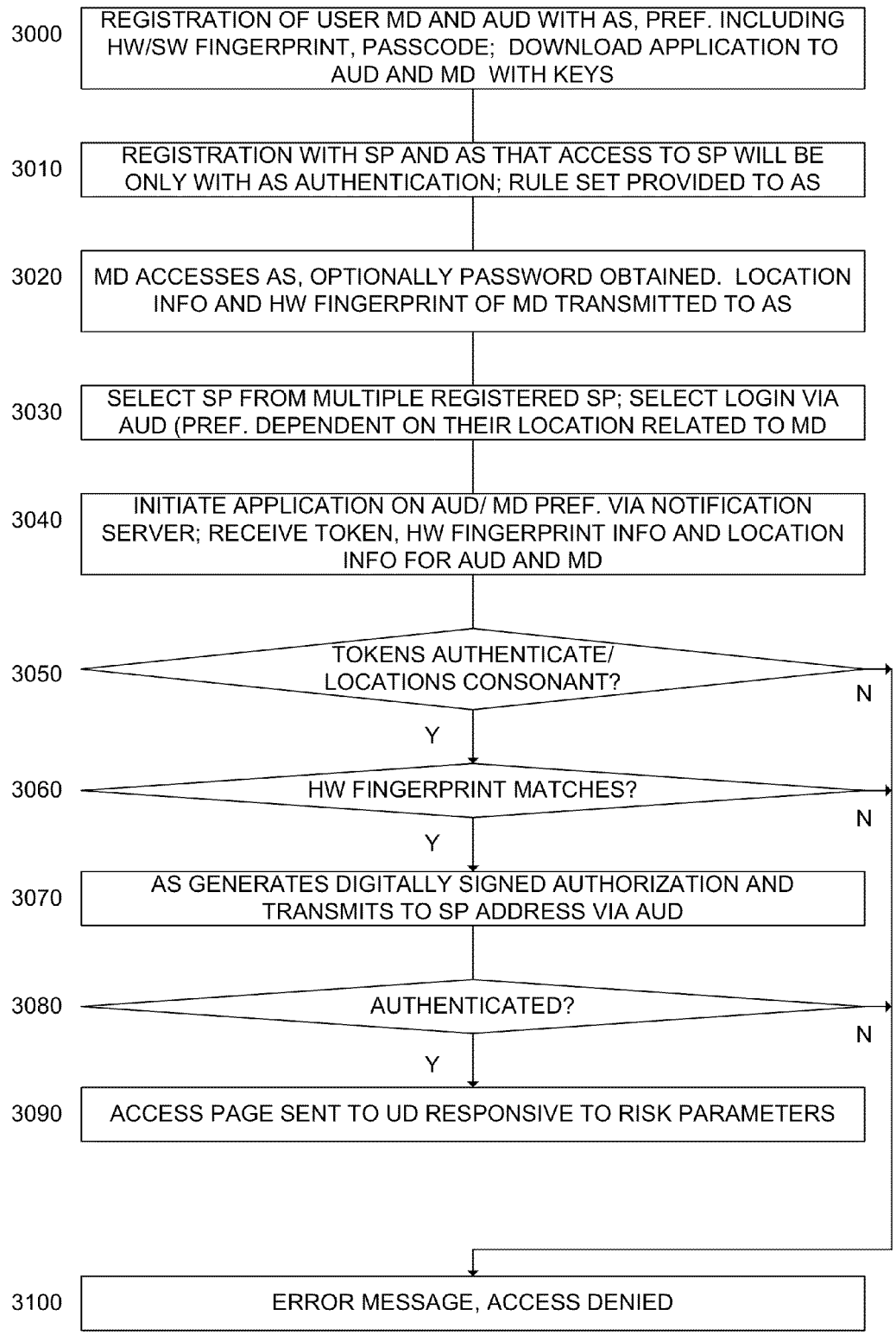
FIG. 3B illustrates a high level flow chart of an exemplary embodiment of the operation of the transaction systems of FIG. 3A to provide controlled access.

FIG. 3A illustrates a high level block diagram of an embodiment of transaction system 300 wherein access to an SP 10 is controlled for AUD 120 responsive to AS 30, with access initiated by user MD 40; and FIG. 3B illustrates a high level flow chart of an exemplary embodiment of the operation of transaction system 300 of FIG. 3A, FIGS. 3A and 3B being described herein together for brevity and clarity. FIG. 3A is in all respects similar to FIG. 2A, including DB 32 in communication with AS 30, with the exception that authorization device 40' is not illustrated, and further that a dedicated notification server 235 is provided in direct communication with AS 30. Dedicated notification server 235 is arranged to communicate with devices, such as AUD 30 which is not designed to respond to a general push notification service provided by NS 35. NS 235 comprises a processor and a memory, the memory storing computer readable instructions.

In stage 3000, a user registers user MD 40 with AS 30, providing address information for user MD 40, such an MSISDN, and further optionally providing hardware and/or software fingerprint information so as to uniquely identify each of user MD 40 and AUD 120 to AS 30, and an optional passcode. Furthermore, an AUD is registered and associated with user MD 40. User MD verification application 45 is downloaded from AS 30 to user MD 40, and arranged to preferably run automatically responsive to a communication from AS 30. User MD verification application 45 is preferably provided with one or more user MD encryption keys as will be described further below. AUD verification application 125 is downloaded from AS 30 to AUD 120, and arranged to preferably run automatically responsive to a communication from AS 30.

In stage 3010, the user further registers with one or more SP 10 and AS 30 that access is to be authorized to SP 10 responsive to authentication by AS 30. AS 30 and the selected SP 10 preferably exchange one or more provider keys, and SP 10 provides a rule set for access to AS 30. In one embodiment, access to SP 10 is thus only to be authorized with AS 30 authentication. The level of authentication required by SP 10 is noted, and stored within AS 30. Stages 3000-3010 are performed initially, and only as required to add additionally SPs 10, however there is no need to regularly perform same. The above is described as SP 10 providing the rule set to AS 30, however this is not meant to be limiting in any way, and an authorized party having a key from SP 10 may similarly allow the rule set without exceeding the scope.

In stage 3020, user MD 40 accesses AS 30, which may be performed as access to a web address of AS 30. Optionally, responsive to the rule set of stage 3010, AS 30 requires a passcode for access, or alternately provides access to AS 30 without requiring a passcode under certain predetermined conditions. In one embodiment, the predetermined condition is in the event that a previous login of user MD 40 to AS 30 has occurred with an approved password within a predetermined time frame. Such a condition is a historical condition for user MD 40, and is determined based on historical login information stored on DB 32. User MD verification application 45 provides present location information, if available, from optional GPS peripheral 47, or alternately AS 30 develops present location information for user MD 40, such as by multilateration. User MD verification application 45 further provides a present hardware and/or software fingerprint of user MD 40. Location information may be accurate, responsive to an on-board GPS device, or imprecise, developed responsive to multilateration or network information. The accuracy of the information is preferably determined by AS 30. All retrieved information, and login information, is preferably stored on DB 32 to develop a history of user MD 40.

In stage 3030, AS 30 presents user MD 40 with a user secure domain (USD) page for display on the display device thereof. In the event that multiple SPs 10 have been registered by user MD 40 with AS 30, AS 30 is arranged to display the USD page with multiple SPs 10 on the display device of user MD 40, and receive in return a selected SP 10, responsive to a user gesture to an input device of user MD 40. Furthermore, AS 30 provides user MD 40 with an ability to select one or more AUD 120 to utilize for access to SP 10, preferably the selection of available AUD 120 is responsive to both the initial registration and the proximity of the particular AUD to user MD 40. In particular, in one embodiment only an AUD 120 within a predetermined range of user MD 40 is enabled to be selected on the USD page.

In stage 3040, which may run simultaneously, before, or after, stage 3030, responsive to the rule set of the selected SP 10 of stage 3010, AS 30 transmits to the selected AUD 120, preferably via notification server 235, a message arranged to initiate AUD verification application 125 downloaded in stage 2000. AS 30 further transmits a token, preferably via notification server 235, which may be considered, and alternately called, a security token, to the initiated AUD verification application 125. The message and token may be sent as a single unified transmission without exceeding the scope. Use of notification server 235 advantageously provides OOB security, since the logical data link of notification server 235 is independent of the logical data link between AUD 120 and AS 30. AUD verification application 125 further functions to digitally sign the security token utilizing the keys stored within AUD verification application 125 and return the digitally signed security token to AS 30. There is no requirement that the actual token be directly digitally signed and returned, and a digitally signed verification message which is a function of the token is particularly contemplated. The digitally signed verification message is transmitted along with an identifier of the AUD 120. The location, hardware and/or software fingerprint information for AUD 120 are transmitted with the digitally signed verification message by AUD verification application 125. Preferably, stage 3040 runs silently without requiring user intervention. Location information for AUD 120, if not transmitted, is developed and obtained from network resources by AS 30. The hardware and/or software fingerprint information, and location information, represent present data regarding AUD 120.

Contemporaneously, and as described above, preferably AS 30 transmits to the associated user MD 40, preferably via notification server 35, a message arranged to initiate user MD verification application 45 preferably via notification server 35, which may be considered, and alternately called, a security token, to the initiated user MD verification application 45. User MD verification application 45 functions to digitally sign the security token utilizing the keys stored within user MD verification application 45 and returns the digitally signed security token to AS 30 as a verification message. Other security measures described herein for MD verification application 45 and/or AUD verification application 125 may be similarly performed without exceeding the scope, as indicated by the rule set of stage 3010. Location information for both AUD 120 and user MD 40 are thus provided to AS 30.

In stage 3050, AS 30 authenticates the received digitally signed authentications of stage 3040 and further location information for AUD 120 and user MD 40 are compared to ensure that they are consonant within a predetermined range, i.e. is AUD 120 within the UPS of user MD 40.

In the event that in stage 3050 the received digitally signed authentication of stage 3040 is authenticated, and AUD 120 is within the UPS of user MD 40, in stage 3060 the hardware, and/or software fingerprint information of stage 3040, and optional a passcode of stage 3040 for AUD 120, are compared with any hardware and/or software fingerprint information and passcode information of stage 3040, thus confirming that historical information for AUD 120 and/or user MD 40 are consonant with present information. A similar confirmation is optionally performed for user MD 40. In the event that the hardware and/or software fingerprint information matches, and optionally passcode information matches, in stage 3070 AS 30 generates and transmits a signed authentication utilizing the exchanged provider keys of stage 3010. The generated signed authentication is transmitted to the address of the selected SP 10 via AUD 120. The generated signed authentication preferably includes information regarding the level of authentication. For example, has a standard passcode or a specialized passcode been utilized, has an authorization device 40' provided a digitally signed authorization token or has biometric tests integrated with human authentication been performed. As will be discussed further below, each of these are preferably supported by AS 30, and implemented responsive to the requirements of the selected SP 10 as defined in the rule set of stage 3010.

Thus, in stage 3070, a signed authentication provided by AS 30 is transmitted to the selected SP 10 address via AUD 120. Advantageously, prior to accessing SP 10 authentication has already been performed according to SP 10 rules provided to AS 30, and thus time out issues for authentication are avoided. The signed authentication is thus generated responsive to historical and present information regarding one or both of user MD 40 and AUD 120. Optionally, responsive to the rule set of stage 3010, two closed loops are further required for the signed authentication: the first loop constituted of AS 30 and user MD 40; and the second loop constituted of AS 30 and AUD 120. In particular, the closed loop of AS 30 and AUD 120 is performed responsive to an input by user MD 40, preferably in cooperation with NS 235, and the transmitted token via NS 235 is reflected in the returned digitally signed authentication of stage 3040. The transmission of the signed authentication received by AUD 120 from AS 30 to SP 10 is also known as injection. Preferably, since SP 10 has not exchanged keys with AUD 120, the received signed authentication is not further encrypted by AUD verification application 125.

In stage 3080, responsive to the exchanged keys of stage 3010, the received signed authentication of stage 3070 is validated. In the event that the received signed authentication of stage 3080 is validated, in stage 3090 access by AUD 120 to SP 10 is allowed, preferably in accordance with the level of authentication indicated by the signed authentication of stage 3070. Optionally, SP 10 may require an additional password, or other security measure from AUD 120, in accordance with its security requirements and in light of the security level indicated by the received signed authentication of stage 3070. Thus, in one embodiment, the rule set of stage 3010 allows for the generation of a signed authentication, however SP 10 may still require additional security measures.

In the event that in stage 3060 the hardware or software fingerprint information does not match, or the passcode does not match, or in stage 3050 the returned digitally signed authentication of stage 3040 is not validated, or the locations of AUD 120 and user MD 40 are not within the predetermine range, in stage 3100 AS 30 returns an error message to AUD 120, and optionally to user MD 40 indicating that the request has failed and access is denied.

Figure 4A:
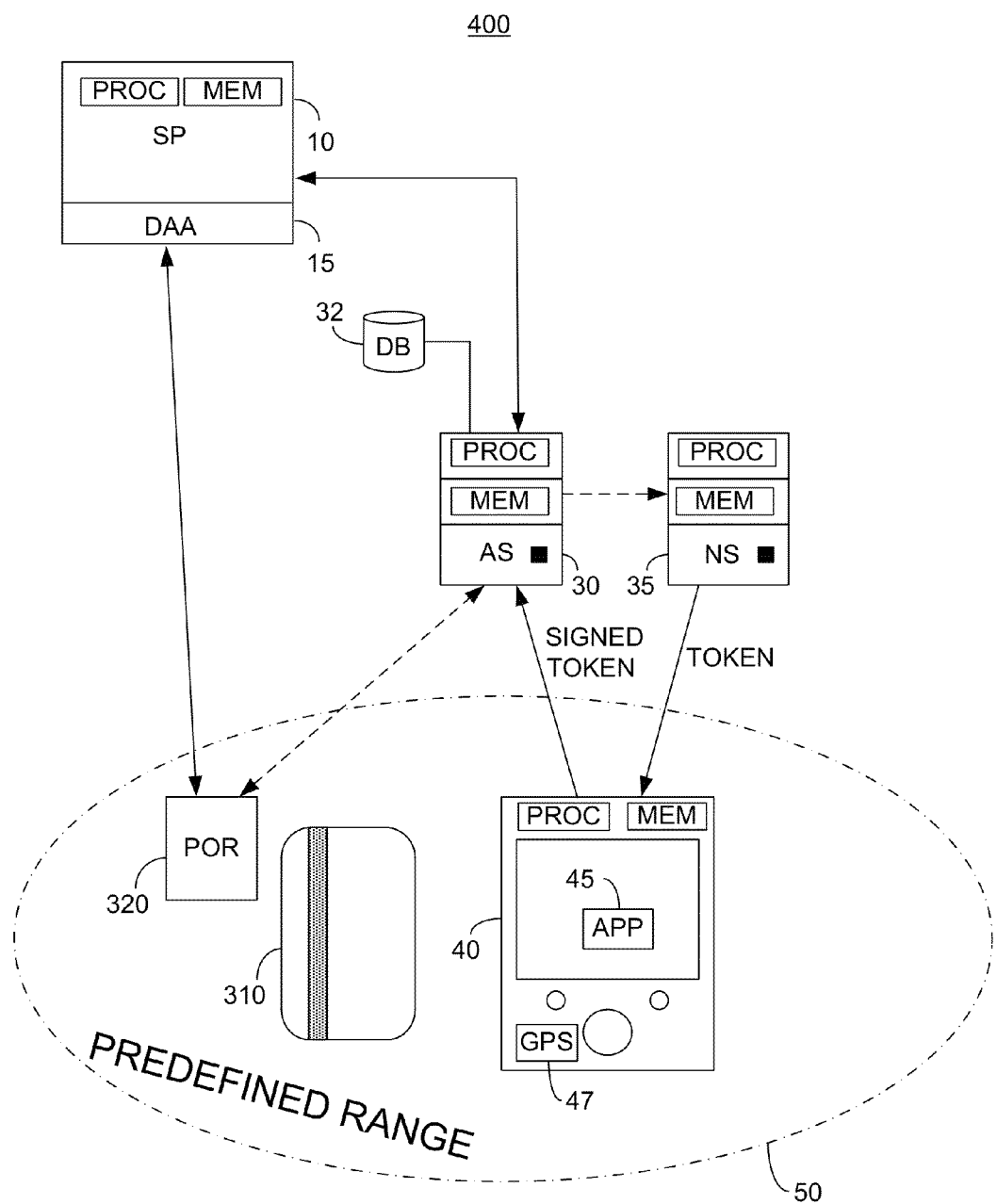
FIG. 4A illustrates a high level block diagram of an embodiment of a transaction system wherein the security of a transaction initiated by a card at a point of reading is enhanced by an AS in cooperation with a user MD.
Figure 4B:
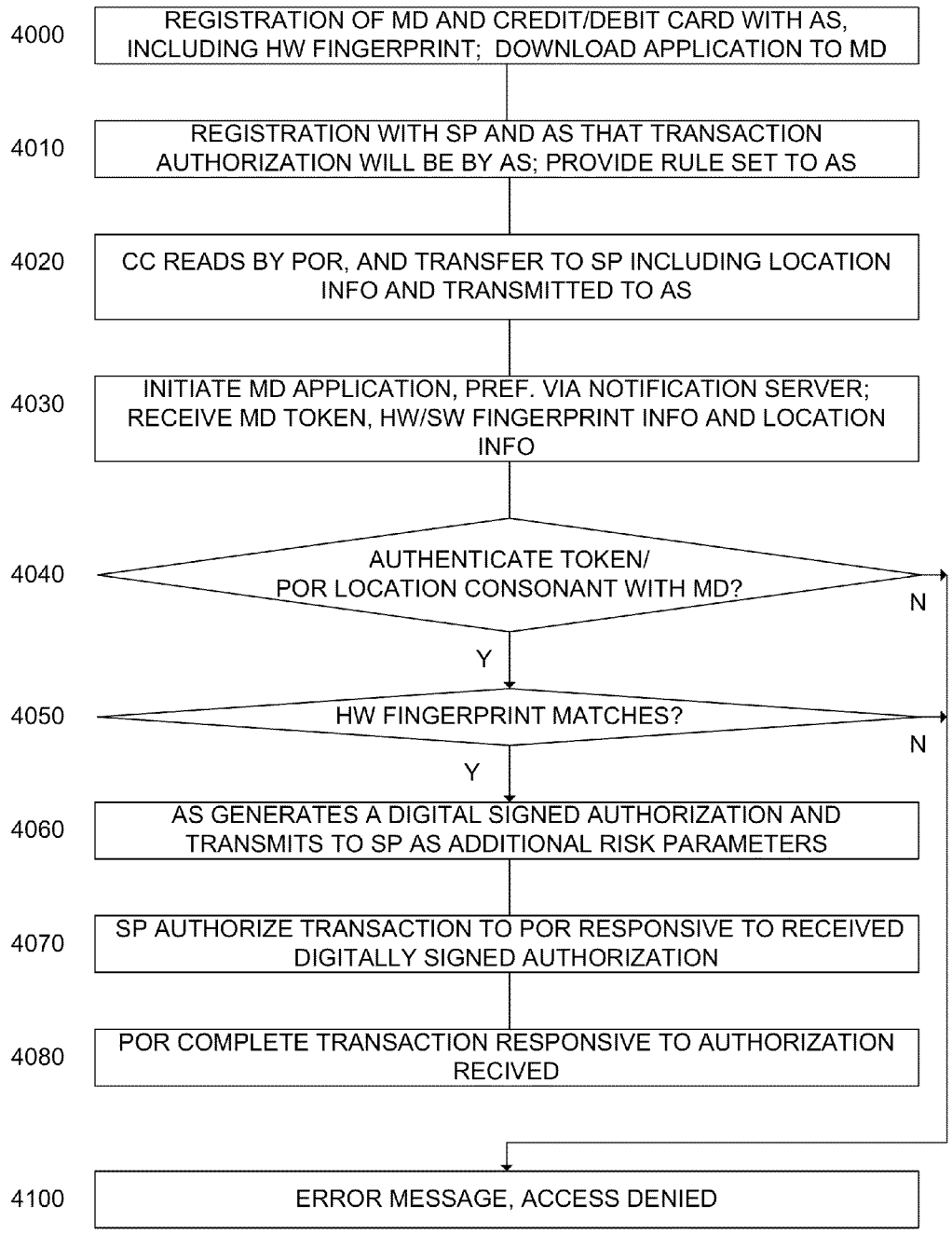
FIG. 4B illustrates a high level flow chart of an exemplary embodiment of the operation of the transaction system of FIG. 4A to provide a secure transaction initiated by a card.

FIG. 4A illustrates a high level block diagram of an embodiment of transaction system 400 wherein the security of a transaction initiated by a card 310 at a point of reading 320 is enhanced by AS 30 in cooperation with user MD 40, and FIG. 4B illustrates a high level flow chart of an exemplary embodiment of the operation of transaction system 400 to provide the secure transaction initiated by the card, FIGS. 4A and 4B being described together for ease of understanding. System 400 is in all respects identical with system 100 of FIG. 2A, with the exception that authorization device 40' is not illustrated, and AUD 120 is not provided. A point of reading (POR) 320 is supplied, arranged to read a card 310, such as a credit or debit card. While a magnetic stripe is shown on card 310 this is not meant to be limiting in any way, and a smart card or any identifier may be utilized without exceeding the scope. SP 10 is in direct communication with AS 30. AS 30 is in communication with DB 32. Preferably POR 320 is in communication with AS 30 as indicated by the dashed line.

In stage 4000, a user registers user MD 40 with AS 30, providing address information for user MD 40, such an MSISDN, and further optionally providing hardware and/or software fingerprint information so as to uniquely identify each of user MD 40 and POR 320 to AS 30 as historical information, and an optional passcode. Furthermore, a debit or credit card, or other readable identifier is registered and associated with user MD 40. User MD verification application 45 is downloaded, preferably from AS 30, to user MD 40, and arranged to preferably run automatically responsive to a communication from AS 30. User MD verification application 45 is preferably provided with one or more user MD encryption keys as will be described further below.

In stage 4010, the user further registers with one or more SP 10 and AS 30 that his credit/debit card 310, or other readable identifier, is to be authorized to SP 10 responsive to authentication by AS 30. AS 30 and the selected SP 10 preferably exchange one or more provider keys, and SP 10 provides an authorization rule set to AS 30. In one embodiment, access to SP 10 is thus only to be authorized with AS 30 authentication. The level of authentication required by SP 10 is provided as part of the rule set, and stored within AS 30, or optionally on DB 32. Stages 4000-4010 are performed initially, and only as required to add additionally SPs 10, however there is no need to regularly perform same.

In stage 4020, card 310 is read by POR 320, and POR 320 transfers to the connected SP 10 identification information read from card 310, or other identifier. SP 10 further obtains location information for POR 320, either supplied by POR 320 or pre-stored within the memory associated with SP 10. SP 10 transfers the identification information and location information to AS 30. In other embodiment, card 310, or other identifier, is read by POR 320, and POR 320 transfers simultaneously to the connected SP 10 and to the AS 30 identification information read from card 310, or other identifier. SP 10 and AS 30 further obtain location information for POR 320, either supplied by POR 320 or pre-stored within the memory associated with SP 10 and AS 30.

In stage 4030, which may pre-initiated by a user by first accessing AS 30 prior to allowing reading of card 310 by POR 320, AS 30 transmits to user MD 40, preferably via notification server 35, a message arranged to initiate user MD verification application 25 downloaded in stage 4000. AS 30 further transmits a token, preferably via notification server 35, which may be considered, and alternately called, a security token, to the initiated user MD verification application 25. The message and token may be sent as a single unified transmission without exceeding the scope. Use of notification server 35 advantageously provides OOB security, since the logical link between notification server 35 and user MD 40 is independent of the logical link between user MD 40 and AS 30. User MD verification application 25 further functions to digitally sign the security token utilizing the keys stored within user MD verification application 25 and return the digitally signed security token to AS 30. There is no requirement that the actual token be directly digitally signed and returned, and a digitally signed verification message which is a function of the token is particularly contemplated. The digitally signed verification message is transmitted along with an identifier of user MD 40. The location, hardware and/or software fingerprint information for user MD 40 are further transmitted with the digitally signed verification message by user MD verification application 25 thus providing present information for user MD 40. Preferably, stage 4030 runs silently without requiring user intervention. Location information, if not transmitted, is developed and obtained from network resources by AS 30. All received information is preferably stored on DB 32 so as to develop a historical running database regarding user MD 40.

In stage 4050, AS 30 authenticates the received digitally signed verification message of stage 4040 and further location information for POR 320 and user MD 40 are compared to ensure that they are consonant within a predetermined range, i.e. is POR 320 within the UPS of user MD 40.

In the event that in stage 4040 the received digitally signed verification message of stage 4030 is authenticated, and POR 320 is within the UPS of user MD 40, in stage 4050 the hardware, and/or software fingerprint information of stage 4030 are compared with any hardware and/or software fingerprint information of stage 4000. In the event that the hardware and/or software fingerprint information matches, in accordance with the rule set of stage 4010, in stage 4060 AS 30 generates and transmits a signed authentication to SP 10 utilizing the exchanged provider keys of stage 4010. The generated signed authentication preferably includes information regarding the level of authentication. For example, has an authorization device 40 provided a digitally signed authorization token or has biometric tests integrated with human authentication been performed. As will be discussed further below, each of these are preferably supported by AS 30, and implemented responsive to the requirements of the selected SP 10.

In another embodiment, immediately upon the receipt of the identification information of stage 4020, AS 30 acts to determine the location of user MD 40, and advises SP 10 of location consonance in advance of any security token closed loop verification. Such a response is rapid, and provides security of a certain level in a short time frame, and thus time out issues for authentication are avoided, particularly in the event that the optional connection between POR 320 and AS 30 is implemented.

The signed authentication is thus generated responsive to historical and present information regarding user MD 40, and optionally responsive to a closed loop consisting of AS 30 and user MD 40, and the transmitted security token via NS 35 is reflected in the returned digitally signed authentication of stage 4030. The security required is determined by the rule set of stage 4010.

In stage 4070, responsive to the exchanged keys of stage 4010, the received signed authentication of stage 4060 is validated. In the event that the received signed authentication of stage 4070 is validated, SP 10 authorizes a transaction to POR 320 responsive to the received validated signed authentication. In stage 4080 POR 320 completes the transaction initiated in the reading of stage 4020.

In the event that in stage 4050 the hardware or software fingerprint information does not match, or in stage 4040 the returned digitally signed authentication of stage 4030 is not validated, or the locations of POR 320 and user MD 40 are not within the predetermine range, in stage 4100 AS 30 returns an error message to SP 10, and optionally to user MD 40 indicating that the request has failed and access is denied. It is to be understood that the match of hardware and/or software fingerprints is in accordance with the rule set of stage 4010, and thus how exact a match is required is further a function of the rule set of stage 4010.

FIGS. 5A-5F illustrate various human authentication and biometric tests which may be variously supported by AS 30 and displayed on of the user MD or the additional user device, for enhanced security. Each of these tests may be utilized by AS 30 prior to issuing the digitally signed authorization, and thereby enabling the digitally signed authorization to reflect confirmation of human input.

Figure 5A:
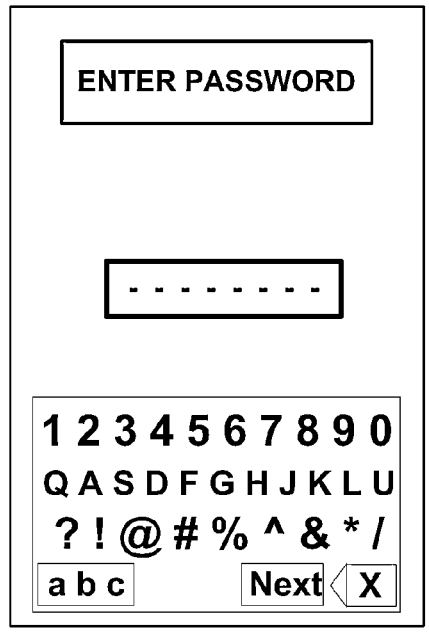
FIGS. 5A-5F illustrate various human authentication and biometric tests which may be variously supported by AS 30 and displayed on the user MD or the additional user device, for enhanced security.

In further detail, in FIG. 5A, a special purpose keyboard, responsive to the passcode is displayed on a display device of user MD 40. Such a keyboard is special purpose in that: keys which are not part of the passcode may randomly deleted; the display does not follow standard QWERTY layout; and the displayed keys are transmitted to user MD 40 as pictures and not as ASCII characters. As such, only coordinates of an input are recorded by the processor user MD 40, without any ability to decipher the password. Thus, fraudster software is faced with an increased obstacle to enter the password, and human verification is accomplished by the proper entry of the passcode. In one embodiment, a predetermined limit is provided, thus further ensuring that the response is due to human input.

Figure 5B:
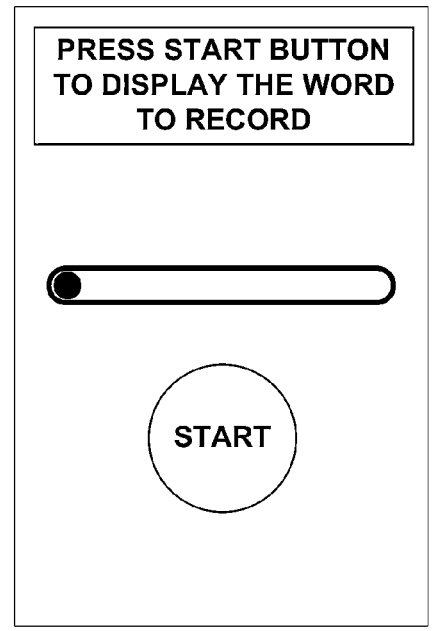

In FIG. 5B, a user first records a plurality of words verbally and stores them associated with the word they represent at AS 30. An entry location on the display device is defined as a start button, and upon selection by a user a randomly selected word from a predetermined list is sent from AS 30 and displayed on a display device of user MD 40 for a predetermined time period.

Figure 5C:
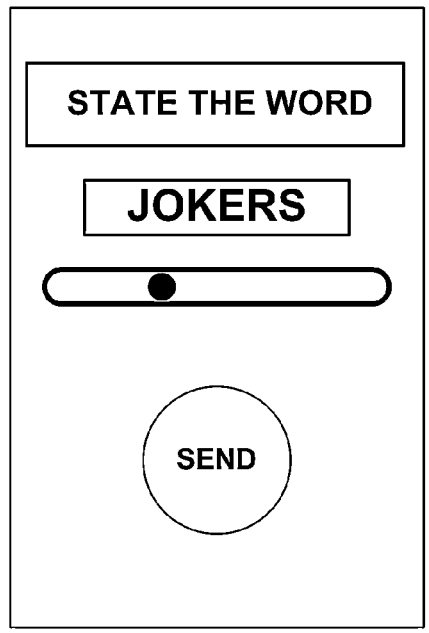

In FIG. 5C verification is accomplished by the user verbalizing the word stored in association with FIG. 5B within a predetermined time period. At the end of verbalizing the word or at the end of the predetermined time period, whichever occurs first, the voice record is transmitted to AS 30, where it is compared with the pre-recorded verbalization of the user's voice from the user's stored verbalization word records, as described above in relation to FIG. 5B. An appropriate match determines that a human, and particularly the pre-designated user, has provided the input, and thus provides to AS 30 verification of "what you are" and biometric approval for "who I am". It is to be understood that an exact match is not required, and consonance between the pre-recorded verbalization with the present voice record may be calculated and confirmation provided within a predetermined range of consonance without exceeding the scope.

Figure 5D:
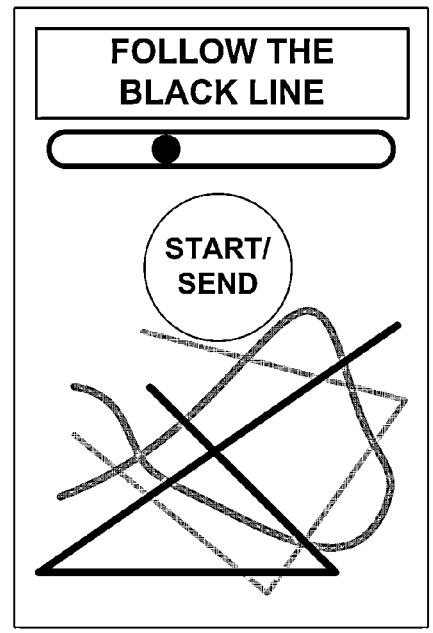

In FIG. 5D, a timer is displayed, and the user is prompted to press a start button shown on a display device of user MD 40 to display the human test such as to follow a particular colored line, intermingled with other lines, with a pointing device or finger. Success provides an indicative of a human input.

Figure 5E:
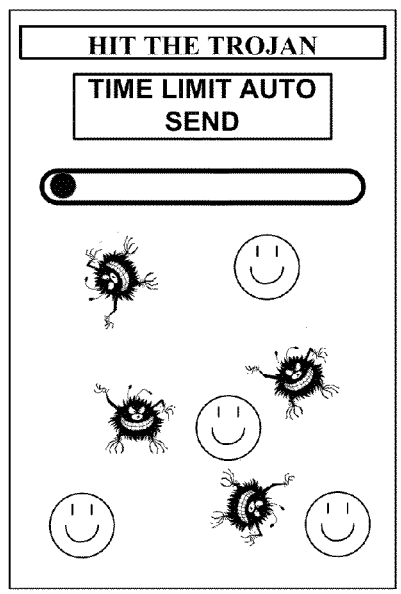

In FIG. 5E, after a user presses a start button shown on a display device of user MD 40 characters randomly appear on the display device of user MD 40, and the user is prompted to gesture against pre-determined character types while avoiding other character types. Again, a timer may be utilized. Success of identification, optionally with a dynamic background, provides a verification of a human input.

Figure 5F:
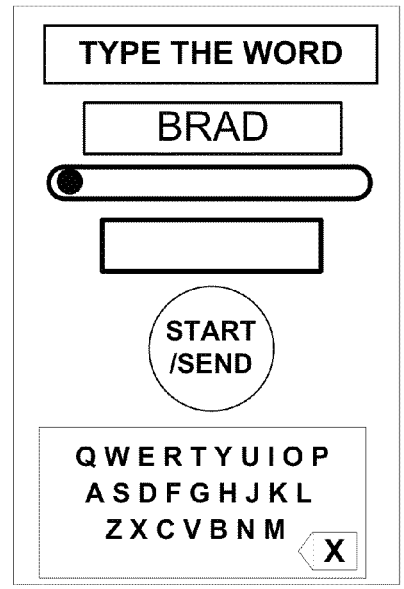

In FIG. 5F, after a user presses a start button shown on a display device of user MD 40 a word is displayed on the display device, and the user is prompted to enter the word on the soft keypad displayed. The word is preferably transmitted as an image, and not as text. Success within a predetermined time period provides a verification of a human input.

The above are listed as non-limiting examples, and many other human authentication tests, and modules, are known to those skilled in the art. Advantageously, by combining a passcode test with a human authentication module, both "what you are" and "who you are" verification is performed. Additionally, without limitation, a visual image of the user may be captured by an imager on user MD 40, and compared with a pre-stored image.

Figure 6:
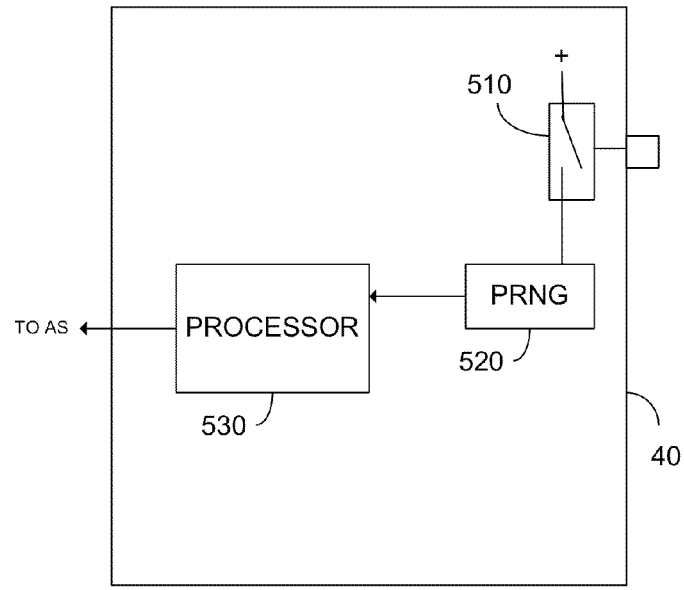
FIG. 6 illustrates a high level schematic of a switch arranged to provide an encrypted datum responsive to a mechanical input thereof, thus confirming a human input.

FIG. 6 illustrates a high level schematic of a switch 510 arranged to provide an encrypted datum responsive to a mechanical input thereof, thus confirming a human input. In particular, a mechanical switch 510 is provided, which when depressed sends a predetermined electrical signal to a pseudo-random number generator (PRNG) 520. PRNG 520 is responsive to at least key which is shared with AS 30, but not shared with user MD processor 530. The output PRNG 520 is fed to user MD processor 530, and user MD processor 530, when running user MD verification application 45, is arranged to transmit the received PRNG 520 to AS 30, thereby providing confirmation of a human input. Advantageously, fraudster software on user MD processor 530 does not have access to the key, and therefore the output of PRNG 520 can not be successfully emulated thereby. Thus, human verification is provided by the requirement to apply mechanical force to mechanical switch 510, which results in the generation of an output signal from PRNG 520 detected at AS 30. The output of PRNG 520 is randomized, and thus the signal output thereby is not repeated and can not be utilized by fraudster software, since repeat use of the output is immediately detected by AS 30.

Figure 7:
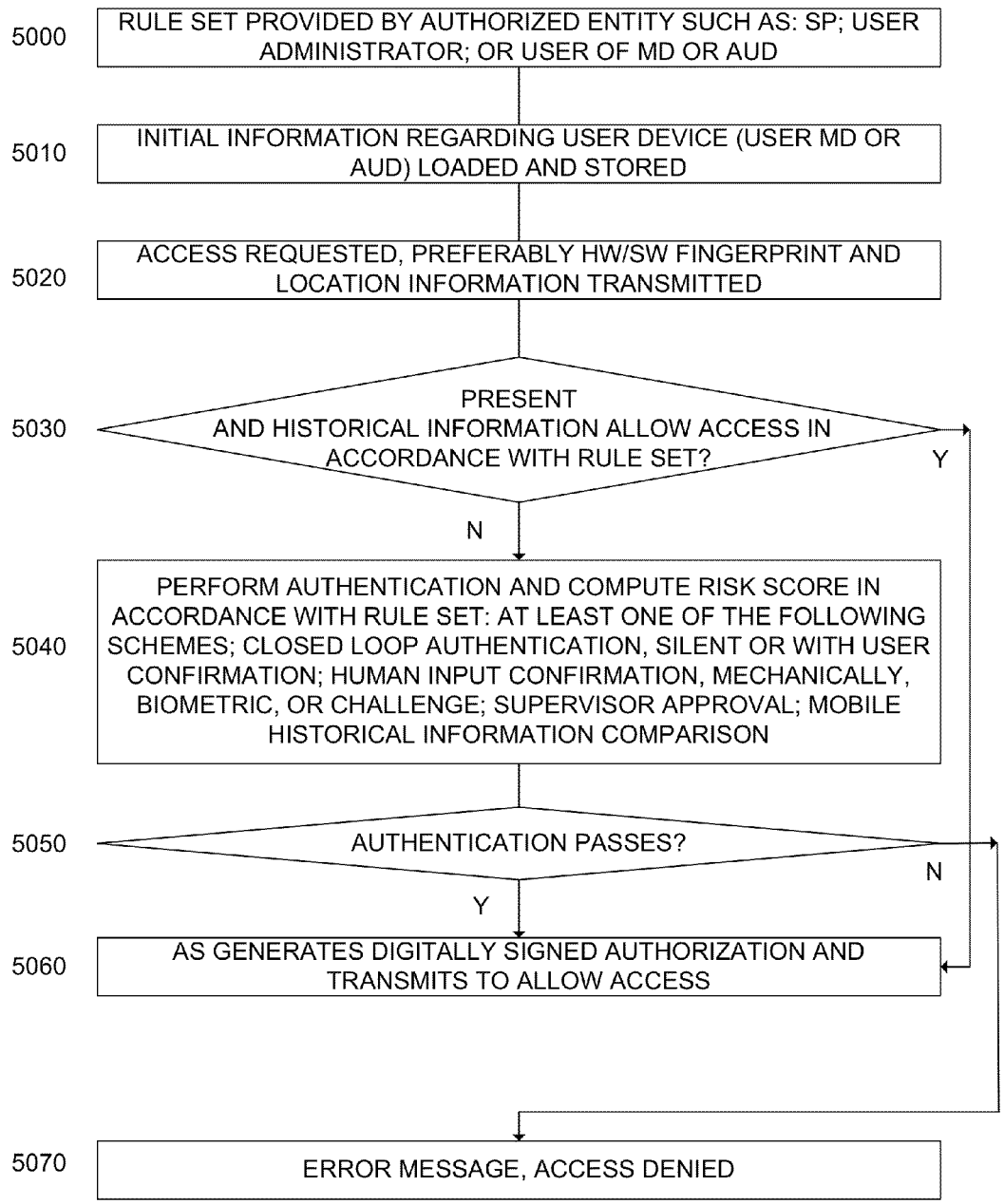
FIG. 7 illustrates a high level flow chart of an exemplary embodiment of the operation of any of the transaction systems above to provide authenticated access responsive to present and historical information.

FIG. 7 illustrates a high level flow chart of an exemplary embodiment of the operation of any of transaction system 5, 100 300 or 400 to provide authenticated access responsive to present and historical information regarding user MD 40 or AUD 120. In stage 5000, a rule set is set by an authorized entity which may be one of SP 10, a user administrator in communication with AS 30 and a user of user MD 40. In stage 5010 initial information for user MD 40 and/or AUD 120 is provided and stored.

In stage 5020, one of user MD 40 and AUD 120 requests access responsive to a signed authentication in accordance with the rule set of stage 5000. Access may be to an SP 10, or to at least one memory location or resource of AUD 120, as described above, without limitation. Preferably HW/SW fingerprint and location information is transmitted to the AS 30 together with the access request.

In stage 5030, AS 30 determines if the historical and present condition allows for access responsive to the rule set of stage 5000. For example, in the event that access been granted to the PS 10, or a successful closed loop token authentication was completed within a predetermined time period, with a predetermined risk score, for the requesting access device, in stage 5060 access is immediately granted, by AS 30 generating a digitally signed authentication and transmitting the digitally signed authentication to the requesting resource of stage 5020.

In the event that in stage 5030 access is not immediately granted, in stage 5040 authentication is performed responsive to the rule set of stage 5000. For example, and as described above, one of a silent verification of a server token in a closed loop, as described above, or verification of a server token in cooperation with a user confirmation in a closed loop is required. Additionally, confirmation that the device presents a human input, as described above, may be required. Alternately, or additionally, a supervisor approval may be required. Alternately, or additionally, communication history such as last calls and SMS, as uploaded by one user MD 40 and AUD 120, may be reviewed and compared with stored information of DB 32 to ensure that present communication patterns are in accordance with historical communication patterns.

Each of the above tests may be required individually, as a pass/fail condition, or alternately may be developed into a risk score, all responsive to the rule set of stage 5000. There is no limitation to the amount, or combination of tests that may be required in the rule set.

The result of the authentication of stage 5040 is reviewed in stage 5050, in cooperation with the rule set of stage 5000. In the event that authentication is successful in accordance with the rule set of stage 5000, stage 5060 as described above is performed. In the event that in stage 5050 authentication is not successful in accordance with the rule set of stage 5000, in stage 5070 an error message is provided to the access requesting device of stage 5020 and access is denied.

Thus, AS 30 provides a mobile centric identity provider responsive to present and historical information regarding user MD 40 and/or AUD 120. The security measures required from user MD 40 by SP 10 may include various measures as described herein, selectable by SP 10 and provided to AS 30 as a rule set. In particular, certain security measures described herein include, but are not limited to: "what you have" such as authentication of user MD 40 by an OOB mechanism and the exchange of a token, hardware fingerprint and software fingerprint; "what you know" such as passcode, which is preferably securely entered on a user tailored keypad transmitted to user MD 40 as coordinates or through the use of a secured keypad; "what you are" human verification, arranged to positively identify that a human user is actively involved, and not a Trojan of other software imitation, such as time limited user authentication module and/or a time limited user voice authentication module and/or the activation of a switch requiring mechanical force input; "who I am" verification such as one or more bio-authentication measures such as voice recognition with a time limited user voice authentication module; "where you are" verification received from user MD 40 and/or the network in communication with user MD 40, or via direct Wi-Fi and/or a location history of user MD 40; and "what you do" verification history parameters retrieved from user MD 40, last user communication such as phone calls and SMS, and last user history managed by AS 30 such as authentication and authorization provided by AS 30 to other SP's 10.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to". The term "connected" is not limited to a direct connection, and connection via intermediary devices is specifically included.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A system arranged to provide access from a user device to a service provider, the system comprising:
    an authentication server, said authentication server comprising an authentication server processor and an associated authentication server non-transitory memory, said authentication server non-transitory memory having loaded thereon instructions readable by said authentication server processor, which when executed by said authentication server processor cause said authentication server to:
    determine that a mobile device has accessed the authentication server;
    in response to said determination, provide to said mobile device a list at least of selectable at least one service provider and at least one registered user device other than said mobile device;
    receive a selection made at said mobile device of a service provider, from among said at least one selectable service provider, to which access is desired, and of a user device, from among said at least one selectable registered user device, by which access to said selected service provider is desired;
    determine whether one or more requirements of one or more rule sets for authentication has been fulfilled; and
    based on the determination that the one or more requirements has been fulfilled, send an authentication message to the selected service provider and authorize the selected service provider to allow access by the selected user device.

2. The system according to claim 1, wherein said authentication server is further arranged to obtain location information for said mobile device and location information for said selected user device, and said authentication server is arranged to send said authentication message in the event that said obtained location information for said mobile device and said obtained location information for said selected user device indicate that said mobile device is within a predetermined range of said selected user device.

3. The system according to claim 2, further comprising the mobile device, said mobile device comprising a peripheral providing location information, a mobile device processor and an associated mobile device non-transitory memory, said mobile device non-transitory memory having loaded thereon instructions readable by said mobile device processor, which when executed by said mobile device processor cause said mobile device to retrieve location information from the location information providing peripheral and to transmit the retrieved location information to said authentication server;
    wherein in the event that transmitted location information for said mobile device indicates that said mobile device is no longer within said predetermined range, said authentication server is further arranged to either:
    notify said selected user device that location security has been breached; or
    notify the selected service provider of cancellation of said sent authentication message.

4. The system according to claim 1, further comprising said selected user device, said selected user device comprising a user device processor and an associated user device non-transitory memory, said user device non-transitory memory having loaded therein an operating system, said selected service provider being the operating system on the selected user device;
    the operating system arranged to receive an authentication message and to allow access by said selected user device, said selected user device arranged to, after having been allowed access to the operating system, access at least one memory location of the user device non-transitory memory, or a resource on the selected user device.

5. The system according to claim 1, wherein said authentication message is sent by injecting said authentication message to said selected user device, thereby causing said selected user device to provide an authentication message to the selected service provider.

6. The system according to claim 5, wherein said injected authentication message and said provided authentication message are identical.

7. The system according to claim 1, further comprising said selected user device, wherein said selected user device comprises a user device processor and an associated user device memory readable by said user device processor, said user device non-transitory memory having loaded thereon instructions, which when executed by said user device processor cause said selected user device to:
    send a user device verification message to said authentication server, wherein receipt of said verification message by said authentication server from said selected user device is one of said one or more requirements, and wherein said user device verification message comprises present information regarding said selected user device selected from a group comprising: a hardware fingerprint, a software fingerprint, a present geographical location of the selected user device, and user recent interaction with the selected user device.

8. The system according to claim 1, further comprising said mobile device, said mobile device comprising a mobile device processor and an associated mobile device non-transitory memory, said mobile device non-transitory memory having loaded thereon a verification application comprising instructions readable by said mobile device processor, which when executed by said mobile device processor cause said mobile device to send to said authentication server a mobile device verification message, wherein receipt of said mobile device verification message by said authentication server from said mobile device is one of said one or more requirements and wherein said mobile device verification message comprises an identifier of the mobile device and present information regarding said mobile device, the present information selected from a group comprising a hardware fingerprint, a software fingerprint, a present geographical location of the mobile device, and user recent interaction with the mobile device.

9. The system according to claim 1, wherein the authentication server is further arranged to maintain historical information regarding said mobile device, said at least one selectable registered user device, and authentication messages sent by said authentication server, and wherein said authentication server is arranged to consider said historical information and present information when determining whether at least one of said one or more requirements has been fulfilled.

10. The system according to claim 9, wherein said historical information includes information which is a factor in generating a security risk score, responsive to said present information and said historical information, for determining whether at least one of said one or more requirements has been fulfilled.

11. The system according to claim 1, wherein said at least one selectable service provider comprises a plurality of selectable service providers and wherein at least one of said one or more requirements is associated with said selected service provider but not associated with at least one other of said plurality of selectable service providers.

12. The system according to claim 1, further comprising said selected service provider, wherein said selected service provider is arranged to allow access by said user device after receiving an authentication message.

13. The system according to claim 12, wherein said service provider is further arranged to allow access by said selected user device after receiving an authentication message and performing at least one of: validating said received authentication message, receiving a password from said selected user device, or requiring any other security measure from said selected user device.

14. The system according to claim 1, further comprising said mobile device, said mobile device comprising a mobile device processor and an associated mobile device non-transitory memory, said mobile device non-transitory memory having loaded thereon instructions readable by said mobile device processor, which when executed by said mobile device processor cause said mobile device to:
  access said authentication server,
  display said list, and
  responsive to at least one user gesture, transmit said selection.

15. The system according to claim 1, wherein said list also includes said mobile device because said mobile device is alternatively selectable for accessing a service provider from among said at least one selectable service provider.

16. A method of providing access from a user device to a service provider, the method comprising:
  determining, by an authentication server, that a mobile device has accessed the authentication server;
  in response to said determination, providing by the authentication server to said mobile device a list at least of selectable at least one service provider and at least one registered user device other than said mobile device;
  receiving, by the authentication server, a selection made at said mobile device of a service provider, from among said at least one selectable service provider, to which access is desired and of a user device, from among said at least one selectable registered user device, by which access to said selected service provider is desired;
  determining, by the authentication server, whether one or more requirements of one or more rule sets for authentication has been fulfilled; and
  based on the determination that the one or more requirements has been fulfilled, sending, by the authentication server, an authentication message to the selected service provider and authorizing the selected service provider to allow access by the selected user device.

17. The method according to claim 16, further comprising:
  the authentication server obtaining location information for said selected user device; and
  the authentication server obtaining location information for said mobile device,
  wherein said authentication message is sent in the event that the obtained location information for said mobile device and the obtained location information for said selected user device indicate that the mobile device is within a predetermined range of the selected user device.

18. The method according to claim 17, further comprising:
  the authentication server obtaining updated location information for said mobile device after the authentication message has been sent to the selected service provider; and
  in the event that the updated location information of said mobile device indicates that the mobile device is no longer within said predetermined range, the authentication server either:
  notifying the selected user device that location security has been breached; or
  notifying the selected service provider of cancellation of said sent authentication message.

19. The method according to claim 16, wherein the selected service provider is an operating system loaded on a non-transitory memory of the selected user device, the method further comprising:
  the operating system receiving an authentication message and allowing access by the selected user device; and
  the selected user device accessing at least one memory location, or resource, on the selected user device, after having been allowed access to the operating system.

20. The method of claim 16, further comprising:
  the selected service provider allowing access by said selected user device.

21. The method of claim 16, further comprising:
  the mobile device accessing said authentication server;
  the mobile device displaying said list; and
  responsive to at least one user gesture, the mobile device transmitting said selection.

22. The method according to claim 16, wherein said authentication message is sent by injecting said authentication message to said selected user device, thereby causing said selected user device to provide an authentication message to the selected service provider.

23. The method according to claim 16, wherein receipt of a user device verification message by said authentication server from the selected user device is one of said one or more requirements, and wherein said selected user device verification message comprises present information regarding the selected user device selected from a group comprising: a hardware fingerprint, a software fingerprint, a present geographical location of the selected user device, and user recent interaction with the selected user device.

24. The method according to claim 16, wherein receipt of a mobile device verification message by said authentication server from the mobile device is one of said one or more requirements, and wherein said mobile device verification message comprises an identifier of the mobile device and present information regarding said mobile device, the present information selected from a group comprising: a hardware fingerprint, a software fingerprint, a present geographical location of the mobile device, and user recent interaction with the mobile device.

25. The method according to claim 16, further comprising: the authentication server maintaining historical information regarding said mobile device, said at least one selectable registered user device, and authentication messages sent by said authentication server, wherein the authentication server considers said historical information and present information when determining whether at least one of said one or more requirements has been fulfilled.

26. A computer program product comprising a non-transitory computer readable medium having computer readable program code embodied therein for providing access from a user device to a service provider, the computer program product comprising:

computer readable program code for causing an authentication server to determine whether said authentication server has been accessed by a mobile device, and in response to said determination, provide to said mobile device a list at least of selectable at least one service provider and at least one registered user device other than said mobile device;

computer readable program code for causing the authentication server to receive a selection made at said mobile device of a service provider, from among said at least one selectable service provider, to which access is desired, and of a user device, from among said at least one selectable registered user device, by which access to said selected service provider is desired; and computer readable program code for causing the authentication server to determine whether one or more requirements of one or more rule sets for authentication has been fulfilled, and based on the determination that the one or more requirements has been fulfilled, send an authentication message to said selected service provider and authorize said selected service provider to allow access by said selected user device.

* * * * *